United States Patent
Takii et al.

(12) 
(10) Patent No.: US 11,226,196 B2
(45) Date of Patent: Jan. 18, 2022

(54) EYEGLASS FRAME SHAPE MEASUREMENT DEVICE AND LENS PROCESSING DEVICE

(71) Applicant: NIDEK CO., LTD., Gamagori (JP)

(72) Inventors: Michihiro Takii, Aichi (JP); Kunihito Mizukoshi, Aichi (JP); Tomoya Ishii, Aichi (JP); Kyoji Takeichi, Aichi (JP)

(73) Assignee: NIDEK CO., LTD., Aichi (JP)

( * ) Notice: Subject to any disclaimer, the term of this patent is extended or adjusted under 35 U.S.C. 154(b) by 0 days.

(21) Appl. No.: 16/635,308

(22) PCT Filed: Jun. 6, 2018

(86) PCT No.: PCT/JP2018/021700
§ 371 (c)(1),
(2) Date: Jan. 30, 2020

(87) PCT Pub. No.: WO2019/026416
PCT Pub. Date: Feb. 7, 2019

(65) Prior Publication Data
US 2020/0158496 A1 May 21, 2020

(30) Foreign Application Priority Data
Jul. 31, 2017 (JP) .............................. JP2017-148366

(51) Int. Cl.
*G01B 11/24* (2006.01)
*B24B 9/14* (2006.01)

(52) U.S. Cl.
CPC .............. *G01B 11/24* (2013.01); *B24B 9/148* (2013.01)

(58) Field of Classification Search
CPC ........... G01B 11/24; B24B 9/14; B24B 9/148; G02C 13/00
(Continued)

(56) References Cited

U.S. PATENT DOCUMENTS

| 6,122,063 A | 9/2000 | Berndt et al. |
| 6,325,700 B1 | 12/2001 | Mizuno et al. |

(Continued)

FOREIGN PATENT DOCUMENTS

| CN | 1460834 A | 12/2003 |
| CN | 101339020 A | 1/2009 |

(Continued)

OTHER PUBLICATIONS

International Search Report dated Jul. 24, 2018 issued by the International Searching Authority in counterpart International Application No. PCT/JP2018/021700 (PCT/ISA/210).
(Continued)

*Primary Examiner* — Tri T Ton
(74) *Attorney, Agent, or Firm* — Sughrue Mion, PLLC

(57) ABSTRACT

An eyeglass frame shape measurement device measures a shape of an eyeglass frame. The eyeglass frame shape measurement device includes a light projecting optical system that has a light source and emits measurement light from the light source toward a groove of a rim of an eyeglass frame, a light receiving optical system that has a detector and causes the detector to receive reflected light of the measurement light emitted toward the groove in the rim of the eyeglass frame by the light projecting optical system and reflected by the groove of the rim of the eyeglass frame, an acquisition section that acquires a cross-sectional shape of the groove of the rim of the eyeglass frame on the basis of the reflected light received by the detector, and a luminance control section that controls a luminance level of the reflected light to be received by the detector.

19 Claims, 13 Drawing Sheets

(58) Field of Classification Search
USPC .................................................. 356/600–640
See application file for complete search history.

(56) References Cited

U.S. PATENT DOCUMENTS

| | | |
|---|---|---|
| 6,350,190 B1 | 2/2002 | Matsuyama |
| 2002/0041357 A1 | 4/2002 | Farcy et al. |
| 2004/0016136 A1 | 1/2004 | Igarashi et al. |
| 2005/0275802 A1 | 12/2005 | Nauche et al. |
| 2009/0007444 A1 | 1/2009 | Shibata |
| 2009/0222122 A1 | 9/2009 | Daimaru et al. |
| 2010/0194283 A1 | 8/2010 | Ochi et al. |
| 2011/0131823 A1 | 6/2011 | Matsuyama |
| 2011/0292406 A1 | 12/2011 | Hollenbeck et al. |
| 2013/0027709 A1 | 1/2013 | Schneider et al. |
| 2014/0373368 A1 | 12/2014 | Shibata et al. |

FOREIGN PATENT DOCUMENTS

| | | |
|---|---|---|
| CN | 101793506 A | 8/2010 |
| CN | 102121813 A | 7/2011 |
| CN | 102203550 A | 9/2011 |
| CN | 102466471 A | 5/2012 |
| CN | 102834692 A | 12/2012 |
| CN | 102869951 A | 1/2013 |
| CN | 103868935 A | 6/2014 |
| DE | 199 19 311 C1 | 2/2001 |
| EP | 2 538 172 A1 | 12/2012 |
| GB | 2 444 959 A | 6/2008 |
| JP | 5-118826 A | 5/1993 |
| JP | 2000-314617 A | 11/2000 |
| JP | 2001-519025 A | 10/2001 |
| JP | 2006-350264 A | 12/2006 |
| JP | 2010-237008 A | 10/2010 |
| JP | 2010-256151 A | 11/2010 |
| JP | 2015-7536 A | 1/2015 |
| JP | 2015-68713 A | 4/2015 |
| JP | 2016-193468 A | 11/2016 |

OTHER PUBLICATIONS

Written Opinion dated Jul. 24, 2018 issued by the International Searching Authority in counterpart International Application No. PCT/JP2018/021700 (PCT/ISA/237).

Office Action dated Apr. 8, 2021 by the State Intellectual Property Office of P.R. China in counterpart Chinese Patent Application No. 201880049901.6.

Search Report dated Mar. 23, 2021 by the European Patent Office in counterpart European Patent Application No. 18842012.9.

EYEGLASS FRAME SHAPE MEASUREMENT DEVICE AND LENS PROCESSING DEVICE

CROSS-REFERENCE TO RELATED APPLICATIONS

This application is a National Stage of International Application No. PCT/JP2018/021700 filed Jun. 6, 2018, claiming priority based on Japanese Patent Application No. 2017-148366, filed Jul. 31, 2017, the contents of all of which are incorporated herein by reference in their entirety.

TECHNICAL FIELD

The present disclosure relates to an eyeglass frame shape measurement device for obtaining a shape of an eyeglass frame, and a lens processing device for processing a peripheral edge of a lens using the eyeglass frame shape measurement device.

BACKGROUND ART

An eyeglass frame shape measurement device that traces a contour of a rim and measures a shape of the rim by inserting a probe into the rim of an eyeglass frame, pressing the probe against the rim, and moving the rim is known (for example, refer to Patent Literature 1). Based on the rim measurement result (trace data) obtained by the eyeglass frame shape measurement device, a shape (target shape) for fitting the eyeglass lens to the rim is obtained. In addition, the contour shape of the eyeglass lens is determined based on the shape, and the peripheral edge of the lens is processed by the eyeglass lens processing device.

CITATION LIST

Patent Literature

Patent Literature 1: JP-A-2015-007536

SUMMARY OF INVENTION

Incidentally, in order to excellently frame the processed lens into the eyeglass frame, it is considered that the shape of the rim and the contour shape of the processed lens are preferably close to each other. However, in the measurement of the rim shape using the probe, it is easy to perform measurement (for example, measurement of a part of the bottom of the rim) at the position where the probe is pressed, but it is difficult to obtain a cross-sectional shape of a groove of the rim.

In view of the above-described related art, an object of the technology of the present disclosure is to provide an eyeglass frame shape measurement device that can easily and accurately acquire a cross-sectional shape of a rim of an eyeglass frame regardless of the type of the eyeglass frame, and a lens processing device.

In order to solve the above-described problems, the present disclosure has the following configuration.

(1) According to a first aspect of the present disclosure, there is provided an eyeglass frame shape measurement device that measures a shape of an eyeglass frame, including: a light projecting optical system having a light source and emitting measurement light from the light source toward a groove of a rim of an eyeglass frame; a light receiving optical system having a detector and causing the detector to receive reflected light of the measurement light emitted toward the groove of the rim of the eyeglass frame by the light projecting optical system and reflected by the groove of the rim of the eyeglass frame; acquisition means for acquiring a cross-sectional shape of the groove of the rim of the eyeglass frame based on the reflected light received by the detector; and luminance control means for controlling a luminance level of the reflected light to be received by the detector.

(2) According to a second aspect of the present disclosure, there is provided a lens processing device for processing a peripheral edge of a lens, including: processing control means for processing a peripheral edge of a lens based on a cross-sectional shape of a groove of the rim of the eyeglass frame acquired by the eyeglass frame shape measurement device according to (1).

DESCRIPTION OF EMBODIMENTS

Figure 1:
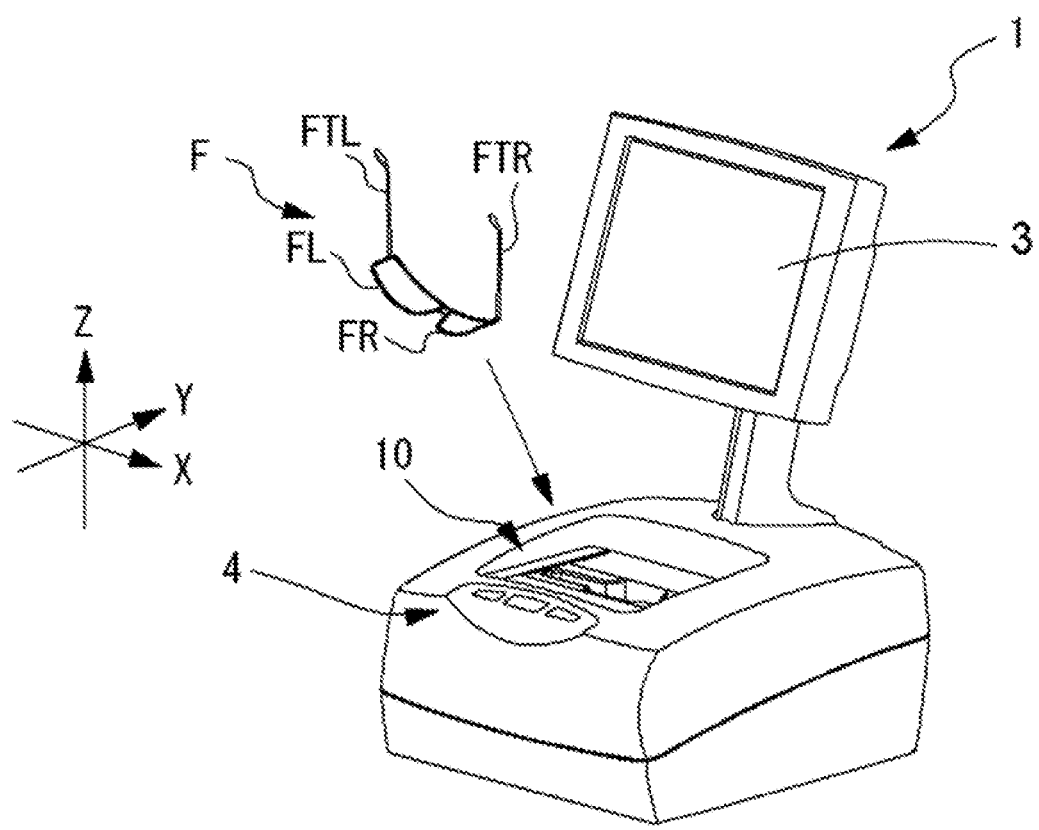
FIG. 1 is a schematic external view of an eyeglass frame shape measurement device.

Hereinafter, the present embodiment will be described below with reference to the drawings. FIGS. 1 to 13 are views for describing a configuration of an eyeglass frame shape measurement device according to the present embodiment. In the present embodiment, a depth direction (an up-down direction of an eyeglass frame when eyeglasses are disposed) of an eyeglass frame shape measurement device 1 is referred to as a Y direction, a horizontal direction on a plane orthogonal (a left-right direction of the eyeglass frame when the eyeglasses are disposed) to the depth direction is referred as an X direction, and a perpendicular direction (a front-rear direction of the eyeglass frame when the eyeglasses are disposed) is referred to as a Z direction.

In addition, in the eyeglass frame shape measurement device 1 according to the present embodiment, a rim part of an eyeglass frame F is disposed in a state of being downward and a temple part of the eyeglass frame F is disposed in a state of being upward. In other words, in a case where the eyeglass frame F is disposed in the eyeglass frame shape measurement device 1, left and right rims FL and FR of the eyeglass frame F are downward, and left and right temples FTL and FTR of the eyeglass frame F are upward. In the eyeglass frame shape measurement device 1 according to the present embodiment, a configuration in which the rim part of the eyeglass frame F is disposed in a state of being downward and the temple part of the eyeglass frame F is disposed in a state of being upward is described as an example, but it is needless to say that the present disclosure is not limited thereto. For example, a configuration in which the rim part of the eyeglass frame F is disposed in a state of being upward and the temple part of the eyeglass frame F is disposed in a state of being downward may be employed. In addition, for example, in a case where the eyeglass frame F is disposed in the eyeglass frame shape measurement device 1, a configuration in which upper ends of the left and right rims FL and FR of the eyeglass frame F are disposed to be downward, and lower ends of the left and right rims FL and FR of the eyeglass frame F are disposed to be upward may be employed. In addition, for example, in a case where the eyeglass frame F is disposed in the eyeglass frame shape measurement device 1, a configuration in which the upper ends of the left and right rims FL and FR of the eyeglass frame F are disposed to be upward, and the lower ends of the left and right rims FL and FR of the eyeglass frame F are disposed to be downward may be employed.

<Overview>

An overview of the eyeglass frame shape measurement device (for example, eyeglass frame shape measurement device 1) according to an embodiment of the present disclosure will be described. For example, the eyeglass frame shape measurement device according to the present embodiment measures the shape of the eyeglass frame. For example, the eyeglass frame shape measurement device includes a light projecting optical system (for example, light projecting optical system 30a). For example, the eyeglass frame shape measurement device includes a light receiving optical system (for example, light receiving optical system 30b). For example, the eyeglass frame shape measurement device includes acquisition means (for example, control portion 50).

For example, the light projecting optical system includes a light source (for example, light source 31). For example, the light projecting optical system emits measurement light (measurement light flux) from the light source toward a groove of a rim the eyeglass frame. For example, at least one light source may be used as the light source. For example, one light source may be used. In addition, for example, a plurality of light sources may be used.

For example, the light receiving optical system includes a detector (for example, detector 37). For example, the light receiving optical system causes the detector to receive reflected light (reflected light flux) of the measurement light which is emitted toward the groove of the rim of the eyeglass frame by the light projecting optical system and reflected by the groove of the rim of the eyeglass frame. In addition, for example, at least one detector may be used as the detector. For example, one detector may be used. For example, a plurality of detectors may be used.

For example, the acquisition means processes the reflected light of the measurement light reflected by the groove of the rim of the eyeglass frame, and acquires the cross-sectional shape of the groove of the rim of the eyeglass frame based on the reflected light of the measurement light received by the detector.

For example, in the present embodiment, the eyeglass frame shape measurement device includes: the light projecting optical system that emits the measurement light from the light source toward the rim of the eyeglass frame; the light receiving optical system that causes the detector to receive the reflected light of the measurement light emitted toward the rim of the eyeglass frame by the light projecting optical system and reflected by the rim of the eyeglass frame; and the acquisition means for acquiring the cross-sectional shape of the rim of the eyeglass frame by processing the reflected light. Accordingly, for example, the cross-sectional shape of the rim of the eyeglass frame can be acquired easily and accurately. In addition, for example, since measurement is performed using the measurement light, the measurement can be performed quickly.

<Light Projecting Optical System>

For example, the light projecting optical system may include an optical member. In this case, for example, the measurement light emitted from the light source may be emitted toward the groove of the rim of the eyeglass frame via each optical member. For example, as the optical member, at least one of a lens, a mirror, a diaphragm, and the like may be used. For example, the focal depth can increase by using a diaphragm. It is needless to say that the optical member is not limited to the above-described optical member, and different optical members may be used.

For example, the light projecting optical system may be configured such that the measurement light emitted from the light source is emitted toward the groove of the rim of the eyeglass frame. For example, a configuration having the light source at least may be employed. Further, for example, the light projecting optical system may be configured such that the measurement light emitted from the light source is emitted toward the groove of the rim of the eyeglass frame via a member different from the optical member.

For example, the measurement light emitted toward the groove of the rim of the eyeglass frame by the light projecting optical system may be emitted as spot-like measurement light. Further, for example, the measurement light emitted toward the groove of the rim of the eyeglass frame by the light projecting optical system may be measurement light (for example, slit-like measurement light) having a width. In this case, for example, the light projecting optical system may emit the measurement light from the light source toward the groove of the rim of the eyeglass frame and form a light cutting surface on the groove of the rim. For example, the light receiving optical system may cause the detector to receive the reflected light (for example, scattered light, regular reflected light, and the like) of the groove of the rim acquired by reflection (for example, scattering, regular reflection, and the like) at the groove of the rim of the light cutting surface.

For example, in a case of emitting the measurement light having a width, a light source that emits a slit-like light flux may be used. For example, a point light source may be used. In this case, for example, a plurality of point light sources may be arranged side by side to emit the measurement light having a width. Further, for example, the measurement light having a width may be emitted by scanning a spot-like light flux emitted from the point light source. In addition, for example, the measurement light having a width may be emitted by diffusing a spot-like measurement light emitted from the point light source by the optical member. It is needless to say that, for example, as the light source, various types of light sources different from the above-described light source may be used to emit the measurement light having a width.

<Light Receiving Optical System>

For example, the light receiving optical system may include an optical member. In this case, for example, the reflected light of the measurement light reflected by the groove of the rim of the eyeglass frame may be received by the detector via each optical member. For example, as the optical member, at least one of a lens, a mirror, a diaphragm, and the like may be used. It is needless to say that the optical member is not limited to the above-described optical member, and different optical members may be used.

For example, the light receiving optical system may be configured such that the reflected light of the measurement light reflected by the groove of the rim of the eyeglass frame is received by the detector. For example, a configuration having the detector at least may be employed. Further, for example, the light receiving optical system may be configured such that the reflected light of the measurement light reflected by the groove of the rim of the eyeglass frame is received by the detector via a member different from the optical member.

<Acquisition Means>

For example, the acquisition means processes the reflected light of the measurement light reflected by the groove of the rim of the eyeglass frame, and acquires the cross-sectional shape of the groove of the rim of the eyeglass frame. For example, the acquisition means may acquire the cross-sectional shape from a light receiving position of the reflected light in the detector. For example, the cross-sectional shape may be an image (image data). In other words, the cross-sectional shape may be a cross-sectional image. In addition, for example, the cross-sectional shape may be a signal (signal data). In other words, the cross-sectional shape may be signal data of the cross-sectional shape.

For example, examples of the cross-sectional shape include a two-dimensional cross-sectional shape and a three-dimensional cross-sectional shape. For example, the two-dimensional cross-sectional shape is a cross-sectional shape acquired by irradiating the groove of the rim at one vector angle with the measurement light to receive the reflected light. For example, in the present embodiment, the two-dimensional cross-sectional shape is a shape of a surface obtained by cutting the groove of the rim in a direction (Z direction in the present embodiment) orthogonal to a radius vector direction (XY direction in the present embodiment) of the eyeglass frame. For example, the two-dimensional cross-sectional shape may be acquired by scanning the measurement light along a transverse position (Z direction in the present embodiment). For example, the three-dimensional cross-sectional shape is a cross-sectional shape acquired by acquiring the two-dimensional cross-sectional shape for each vector angle. For example, the three-dimensional cross-sectional shape may be acquired by scanning the measurement light for acquiring the two-dimensional cross-sectional shape in a radius vector plane direction (XY plane direction in the present embodiment) of the eyeglass frame.

In addition, for example, when the cross-sectional shape is acquired, in a case where a part of the cross-sectional shape is missing, the missing part may be interpolated from the light reception result of the reflected light at a position (for example, adjacent position) around the position where the part is missing. Further, for example, when the cross-sectional shape is acquired, in a case where a part of the cross-sectional shape is missing, the missing part may be interpolated by approximating the cross-sectional shape. For example, when the cross-sectional shape is acquired, in a case where a part of the cross-sectional shape is missing, the cross-sectional shape may be re-acquired such that the missing part is acquired.

For example, regarding the two-dimensional cross-sectional shape, the two-dimensional cross-sectional shape of the groove of the rim at least at one location (position of one vector angle) in the entire periphery (all parts where the rim is formed at each vector angle) of the rim of the eyeglass frame may be acquired. In this case, for example, the two-dimensional cross-sectional shape may be acquired in the entire periphery of the rim of the eyeglass frame. In this case, for example, the two-dimensional cross-sectional shape may be acquired at a plurality of positions (for example, the left end, the right end, the upper end, and the lower end of the eyeglass frame) in the entire periphery of the rim of the eyeglass frame. In addition, in this case, for example, the two-dimensional cross-sectional shape may be acquired at a position of one vector angle in the entire periphery of the rim of the eyeglass frame.

For example, in a case of acquiring the three-dimensional cross-sectional shape, the three-dimensional cross-sectional shape of the groove of the rim at least at a part of the region within the entire periphery (all parts where the rim is formed at each vector angle) of the rim of the eyeglass frame may be acquired. In this case, for example, the three-dimensional cross-sectional shape may be acquired in the entire periphery of the rim of the eyeglass frame. In this case, for example, the three-dimensional cross-sectional shape may be acquired at a plurality of regions (for example, the left end region, the right end region, the upper end region, and the lower end region of the eyeglass frame) in the entire periphery of the rim of the eyeglass frame. In addition, in this case, for example, the three-dimensional cross-sectional shape may be acquired at a part of the region in the entire periphery of the rim of the eyeglass frame. In addition, in a case where the three-dimensional cross-sectional shape is not acquired with respect to the entire periphery of the rim of the eyeglass frame, and in a case where the three-dimensional cross-sectional shape of the entire periphery of the rim of the eyeglass frame is to be acquired, the three-dimensional cross-sectional shape of the entire periphery of the rim of the eyeglass frame may be acquired by performing interpolation based on the two-dimensional cross-sectional shape (three-dimensional cross-sectional shape) of a part at which the two-dimensional cross-sectional shape is acquired.

<First Changing Means and First Control Means>

For example, the eyeglass frame shape measurement device may include first changing means (for example, moving unit 210 and rotation unit 260). For example, the first changing means changes an irradiation position of the measurement light with respect to the groove of the rim of the eyeglass frame. Further, for example, the eyeglass frame shape measurement device may include first control means (for example, control portion 50) for controlling the first changing means.

For example, the eyeglass frame shape measurement device includes the first changing means for changing the irradiation position of the measurement light with respect to the groove of the rim of the eyeglass frame, and the first control means for controlling the first changing means. Accordingly, it becomes possible to irradiate any position of the groove of the rim in the eyeglass frame with the measurement light, and to acquire the cross-sectional shape of the groove of the rim at any position.

For example, the first changing means may be configured to change a relative position between the irradiation position of the measurement light and the groove of the rim of the eyeglass frame. For example, the first changing means may be configured to change at least one of the irradiation position of the measurement light and the position of the groove of the rim of the eyeglass frame. In this case, for example, the first changing means may be configured to change the position of the groove of the rim of the eyeglass frame with respect to the irradiation position of the measurement light. In other words, the first changing means may be configured to change the position of the eyeglass frame with respect to the irradiation position of the measurement light. In this case, for example, the first changing means may be configured to change the irradiation position of the measurement light with respect to the position of the groove of the rim of the eyeglass frame. In this case, for example, the first changing means may be configured to change both the position of the groove of the rim of the eyeglass frame and the irradiation position of the measurement light.

For example, as a configuration in which the first changing means changes the relative position between the irradiation position of the measurement light and the groove of the rim of the eyeglass frame, a configuration for changing the relative position between the light projecting optical system and the groove of the rim of the eyeglass frame may be employed. For example, the position of the light projecting optical system may be a position of an optical axis (for example, optical axis L1) of the light projecting optical system. In other words, for example, the first changing means may be configured to change the relative position between the irradiation position of the measurement light and the groove of the rim of the eyeglass frame by changing the relative position between the position of the optical axis of the light projecting optical system and the groove of the rim of the eyeglass frame.

For example, as a configuration for changing the relative position between the position (for example, the position of the optical axis of the light projecting optical system) of the light projecting optical system and the position of the groove of the rim of the eyeglass frame, a configuration for changing at least one of the position of the light projecting optical system and the position of the groove of the rim of the eyeglass frame may be employed. In this case, for example, as a configuration for changing at least one of the position of the light projecting optical system and the position of the groove of the rim of the eyeglass frame, a configuration for changing the position of the groove of the rim of the eyeglass frame with respect to the position of the light projecting optical system may be employed. In addition, in this case, for example, as a configuration for changing at least one of the position of the light projecting optical system and the position of the groove of the rim of the eyeglass frame, a configuration for changing the position of the light projecting optical system with respect to the position of the groove of the rim of the eyeglass frame may be employed. Further, in this case, for example, as a configuration for changing at least one of the position of the light projecting optical system and the position of the groove of the rim of the eyeglass frame, a configuration for changing both the position of the light projecting optical system and the position of the groove of the rim of the eyeglass frame may be employed.

For example, as a configuration for changing the position of the light projecting optical system, a configuration for changing the position of at least one member (for example, a light source, an optical member, or other members) included in the light projecting optical system may be employed. In other words, for example, the first changing means may be configured to change the position of the light projecting optical system with respect to the groove of the rim of the eyeglass frame by changing a position of at least a part (a part of the members) of the light projecting optical system. In this case, for example, the first control means may control the first changing means to change the position of at least the part of the light projecting optical system and change the irradiation position of the measurement light with respect to the groove of the rim of the eyeglass frame.

For example, in the eyeglass frame shape measurement device, the first changing means is first changing means for moving at least the part of the light projecting optical system, and the first control means controls the first changing means to move at least the part of the light projecting optical system with respect to the groove of the rim of the eyeglass frame and change the irradiation position of the measurement light with respect to the groove of the rim of the eyeglass frame. Accordingly, it becomes possible to irradiate any position of the groove of the rim in the eyeglass frame with the measurement light, and to acquire the cross-sectional shape of the groove of the rim at any position.

For example, as a configuration for changing the position of at least the part of the light projecting optical system, X-direction driving means having a drive source (for example, a motor) and moving the position of at least the part of the light projecting optical system in the X direction may be employed. For example, as a configuration for changing the position of at least the part of the light projecting optical system, the Y-direction driving means having the drive source (for example, a motor) and moving the position of at least the part of the light projecting optical system in the Y direction may be employed. For example, as a configuration for changing the position of at least the part of the light projecting optical system, Z-direction driving means having a drive source (for example, a motor) and moving the position of at least the part of the light projecting optical system in the Z direction may be employed. For example, as a configuration for changing the position of at least the part of the light projecting optical system, rotation driving means (for example, rotation unit 260) having a drive source (for example, a motor) and rotating the position of at least the part of the light projecting optical system may be employed. Further, for example, as a configuration for changing the position of at least the part of the light projecting optical system, at least one of the X-direction driving means, the Y-direction driving means, the Z-direction driving means, and the rotation driving means may be employed. It is needless to say that a configuration for changing the position of at least the part of the light projecting optical system is not limited to the above-described driving means and a configuration in which driving means for changing the position of at least the part of the light projecting optical system in a direction different from the above-described direction may be employed.

Further, for example, as a configuration for changing the position of at least the part of the light projecting optical system, scanning means having an optical scanner and scanning the optical scanner may be used. In this case, for example, the irradiation position of the measurement light may be changed by changing the angle of the optical scanner. In other words, for example, the irradiation position of the measurement light may be changed by changing the position of the optical scanner.

For example, as a configuration for changing the position of the groove of the rim of the eyeglass frame, the X-direction driving means having a drive source (for example, a motor) and moving the eyeglass frame in the X direction may be employed. In addition, for example, as a configuration for changing the position of the groove of the rim of the eyeglass frame, the Y-direction driving means having the drive source (for example, a motor) and moving the eyeglass frame in the Y direction may be employed. Further, for example, as a configuration for changing the position of the groove of the rim of the eyeglass frame, the Z-direction driving means having a drive source (for example, a motor) and moving the eyeglass frame in the Z direction may be employed. In addition, for example, as a configuration for changing the position of the groove of the rim of the eyeglass frame, the rotation driving means having a drive source (for example, a motor) and rotating the eyeglass frame may be employed. Further, for example, as a configuration for changing the position of the groove of the rim of the eyeglass frame, at least one of the X-direction driving means, the Y-direction driving means, the Z-direction driving means, and the rotation driving means may be employed. It is needless to say that a configuration for changing the position of the groove of the rim of the eyeglass frame is not limited to the above-described driving means and a configuration in which the driving means for changing the position of the groove of the rim of the eyeglass frame in a direction different from the above-described direction may be employed.

<Second Changing Means and Second Control Means>

For example, the eyeglass frame shape measurement device may include second changing means (for example, moving unit 210 and rotation unit 260). For example, the second changing means changes the light receiving position of the reflected light by the light receiving optical system. For example, the eyeglass frame shape measurement device may include second control means (for example, control portion 50) for controlling the second changing means.

For example, in the present embodiment, the eyeglass frame shape measurement device includes the second changing means for changing the light receiving position of the reflected light by the light receiving optical system, and second control means for controlling the second changing means. Accordingly, the light receiving position can be changed to a position where the cross-sectional shape of the groove of the rim can be acquired excellently, and the cross-sectional shape of the rim of the eyeglass frame can be acquired more accurately.

For example, the second changing means may be configured to change the light receiving position of the reflected light by the light receiving optical system by changing the relative position between the position of the light receiving optical system and the groove of the rim of the eyeglass frame. For example, the position of the light receiving optical system may be a position of an optical axis (for example, optical axis L2) of the light receiving optical system. In other words, for example, the second changing means may be configured to change the relative position between the irradiation position of the measurement light and the groove of the rim of the eyeglass frame by changing the relative position between the position of the optical axis of the light receiving optical system and the groove of the rim of the eyeglass frame.

For example, the second changing means may be configured to change at least one of the position of the light receiving optical system and the position of the groove of the rim of the eyeglass frame. In this case, for example, the second changing means may be configured to change the position of the groove of the rim of the eyeglass frame with respect to the position of the light receiving optical system. In other words, the second changing means may be configured to change the position of the eyeglass frame with respect to the position of the light receiving optical system. In this case, for example, the second changing means may be configured to change the position of the light receiving optical system with respect to the position of the groove of the rim of the eyeglass frame. In this case, for example, the second changing means may be configured to change both the position of the groove of the rim of the eyeglass frame and the position of the light receiving optical system.

For example, as a configuration for changing the position of the light receiving optical system, a configuration for changing a position of at least one member (for example, a detector, an optical member, or other members) included in the light receiving optical system may be employed. In other words, for example, the second changing means may be configured to change the position of the light receiving optical system with respect to the groove of the rim of the eyeglass frame by changing the position of at least a part (a part of the members) of the light receiving optical system. In this case, for example, the second control means may control the second changing means to change the position of at least the part of the light receiving optical system and change the light receiving position of the reflected light by the light receiving optical system.

For example, as a configuration for changing the position of at least the part of the light receiving optical system, the X-direction driving means having the drive source (for example, a motor) and moving the position of at least the part of the light receiving optical system in the X direction may be employed. For example, as a configuration for changing the position of at least the part of the light receiving optical system, the Y-direction driving means having the drive source (for example, a motor) and moving the position of at least the part of the light receiving optical system in the Y direction may be employed. For example, as a configuration for changing the position of at least the part of the light receiving optical system, the Z-direction driving means having the drive source (for example, a motor) and moving the position of at least the part of the light receiving optical system in the Z direction may be employed. For example, as a configuration for changing the position of at least the part of the light receiving optical system, the rotation driving means having the drive source (for example, a motor) and rotating the position of at least the part of the light receiving optical system may be employed. Further, for example, as a configuration for changing the position of at least the part of the light receiving optical system, at least one of the X-direction driving means, the Y-direction driving means, the Z-direction driving means, and the rotation driving means may be employed. It is needless to say that a configuration for changing the position of at least the part of the light receiving optical system is not limited to the above-described driving means and a configuration in which driving means for changing the position of at least the part of the light receiving optical system in a direction different from the above-described direction may be employed.

Further, for example, as a configuration for changing the position of at least the part of the light receiving optical system, scanning means having an optical scanner and scanning the optical scanner may be used. In this case, for example, the light receiving position of the reflected light may be changed by the light receiving optical system by changing the angle of the optical scanner. In other words, for example, the light receiving position of the reflected light may be changed by the light receiving optical system by changing the position of the optical scanner.

For example, as a configuration for changing the position of the groove of the rim of the eyeglass frame, a configuration similar to the configuration of <First Changing Means and First Control Means> described above can be used.

For example, the control of the first changing means and the second changing means may be controlled at different timings. Further, for example, the control of the first changing means and the second changing means may be controlled integrally. In addition, for example, at least a part of the members may be used both as the configuration of the first changing means and the configuration of the second changing means.

<Acquisition of Shape of Eyeglass Frame>

For example, the eyeglass frame shape measurement device may acquire the shape (shape data) of the eyeglass frame. In this case, for example, the eyeglass frame shape measurement device may include analysis means (for example, control portion 50). For example, the first control means may control the first changing means to irradiate the groove of the rim at a plurality of vector angles of the eyeglass frame with the measurement light. For example, the acquisition means may acquire the cross-sectional shape of the groove of the rim at each of the plurality of vector angles of the eyeglass frame. For example, the analysis means may detect the bottom of the groove of the rim at each of the plurality of vector angles of the eyeglass frame from the cross-sectional shape of the groove of the rim at the plurality of vector angles of the eyeglass frame, and may acquire the shape of the eyeglass frame based on the detected detection result.

For example, the shape of the eyeglass frame may be a two-dimensional shape (two-dimensional shape data). For example, the two-dimensional shape is represented by data in the radius vector direction (XY direction) of the eyeglass frame. Further, for example, the shape of the eyeglass frame may be a three-dimensional shape (three-dimensional shape data). For example, the three-dimensional shape is represented by data in the radius vector direction (XY direction) of the eyeglass frame and in the direction (Z direction) orthogonal to the radius vector direction. In addition, for example, in a case of acquiring the two-dimensional shape, the analysis means may acquire the two-dimensional shape by detecting the position of the groove of the rim in the XY direction from the three-dimensional shape. In this case, for example, the two-dimensional shape may be acquired by projecting the three-dimensional shape onto the XY plane.

For example, in the eyeglass frame shape measurement device, the first control means controls the first changing means to irradiate the groove of the rim at the plurality of vector angles of the eyeglass frame with the measurement light. The acquisition means may acquire the cross-sectional shape of the groove of the rim at each of the plurality of vector angles of the eyeglass frame. The eyeglass frame shape measurement device includes the analysis means for detecting the bottom of the groove of the rim at each of the plurality of vector angles of the eyeglass frame from the cross-sectional shape of the groove of the rim at the plurality of vector angles of the eyeglass frame to acquire the shape of the eyeglass frame based on the detected detection result. Accordingly, unlike the related art, depending on the eyeglass frame, it is possible to suppress a case where the measurement cannot be performed due to detachment of a probe from the groove of the lens frame, and the shape of the eyeglass frame can be acquired easily and accurately with respect to the various shapes of the eyeglass frame.

For example, the shape of the eyeglass frame may be acquired at least at a part of the region within the entire periphery (all parts where the rim is formed at each vector angle) of the rim of the eyeglass frame. In this case, for example, the shape of the eyeglass frame may be acquired in the entire periphery of the rim of the eyeglass frame. In this case, for example, the shape of the eyeglass frame may be acquired at a plurality of regions (for example, the left end region, the right end region, the upper end region, and the lower end region of the eyeglass frame) in the entire periphery of the rim of the eyeglass frame. In addition, in this case, for example, the shape of the eyeglass frame may be acquired at a part of the region in the entire periphery of the rim of the eyeglass frame. In addition, in a case where the shape of the eyeglass frame is not acquired with respect to the entire periphery of the rim of the eyeglass frame, and in a case where the shape of the eyeglass frame of the entire periphery of the rim of the eyeglass frame is to be acquired, the shape of the entire periphery of the rim of the eyeglass frame may be acquired by performing interpolation based on the shape of a part at which the shape of the eyeglass frame is acquired.

<Acquisition of Three-Dimensional Cross-Sectional Shape>

For example, the eyeglass frame shape measurement device may acquire the three-dimensional cross-sectional shape. For example, the first control means controls the first changing means to irradiate the groove of the rim at a plurality of vector angles of the eyeglass frame with the measurement light. For example, the acquisition means may acquire the three-dimensional cross-sectional shape by acquiring the cross-sectional shape of the groove of the rim at each of the plurality of vector angles of the eyeglass frame.

For example, in the present embodiment, in the eyeglass frame shape measurement device, the first control means controls the first changing means to irradiate the groove of the rim at the plurality of vector angles of the eyeglass frame with the measurement light. The acquisition means acquires the cross-sectional shape of the groove of the rim at each of the plurality of vector angles of the eyeglass frame, and acquires the three-dimensional cross-sectional shape. Accordingly, the three-dimensional cross-sectional shape of the eyeglass frame can be acquired easily and accurately.

<Luminance Control Means>

Here, the inventors examined the eyeglass frame shape measurement device configured to emit the measurement light toward the groove of the rim of the eyeglass frame, receive the reflected light of the measurement light reflected by the groove of the rim of the eyeglass frame, and acquire the cross-sectional shape of the groove of the rim of the eyeglass frame based on the reflected light. For example, it was found out that, in a case where such an eyeglass frame shape measurement device is used, depending on the type of eyeglass frame, the luminance level of the received reflected light was not excellent, and it was difficult to accurately acquire the cross-sectional shape of the groove of the rim. Hereinafter, a configuration for solving this problem will be described.

For example, the eyeglass frame shape measurement device may include luminance control means (for example, control portion 50). For example, the luminance control means controls (changes) the luminance level (luminance value) of the reflected light to be received by the detector. In this manner, for example, in the present embodiment, the eyeglass frame shape measurement device includes, the light projecting optical system that emits the measurement light from the light source toward the rim of the eyeglass frame, the light receiving optical system that causes the detector to receive the reflected light of the measurement light emitted toward the rim of the eyeglass frame by the light projecting optical system and reflected by the rim of the eyeglass frame, and the acquisition means for acquiring the cross-sectional shape of the rim of the eyeglass frame based on the reflected light received by the detector. Further, the eyeglass frame shape measurement device includes the luminance control means for controlling the luminance level of the reflected light to be received by the detector. Accordingly, regardless of the type of the eyeglass frame, the cross-sectional shape of the rim of the eyeglass frame can be acquired easily and accurately.

For example, the luminance control means may control the luminance level by controlling at least one of the members included in the eyeglass frame shape measurement device. For example, each member may be at least one of a light source, a detector, a lens, a reflecting member, and the like.

For example, the luminance control means may control the luminance level of the reflected light to be received by the detector by controlling an amount of the measurement light projected from the light source. Accordingly, for example, the luminance level can be controlled with an easy configuration.

Further, for example, the luminance control means may control the luminance level of the reflected light to be received by the detector by controlling the gain of the detector. Accordingly, for example, the luminance level can be controlled with an easy configuration.

Further, for example, the luminance control means may be configured to provide a member that adjusts the amount of the measurement light in the optical path (in the optical path of the light projecting optical system and the light receiving optical system) from the light source to the detector. In this case, for example, a configuration in which a dedicated member for adjusting the light amount may be provided. For example, the dedicated member may be a light amount adjustment filter or an optical attenuator. In this case, for example, one of the members of the light projecting optical system and the light receiving optical system may be used as a member for adjusting the light amount.

Further, for example, the luminance control means may control the luminance level of the reflected light to be received by the detector by controlling the exposure time in the detector. Further, for example, the luminance control means may control the luminance level of the reflected light to be received by the detector by controlling the light emitting time of the light source.

For example, the luminance control means is not limited to the above-described configuration. For example, the luminance control means may be configured to be able to control the luminance level of the reflected light to be received by the detector.

For example, the luminance control means may have at least one of the above-described configurations. For example, the luminance control means may be configured to include one of the above-described configurations. Further, for example, the luminance control means may combine a plurality of configurations among the above-described configurations. As an example, the luminance control means may perform control of the amount of the measurement light projected from the light source and adjustment of the gain of the detector.

For example, as a configuration in which the luminance control means controls the luminance level, the luminance control means may control the luminance level based on the luminance level of the reflected light. In this case, for example, the luminance control means may control the luminance level based on the luminance level of the reflected light received by the detector. Accordingly, for example, since the luminance level can be controlled in accordance with the detected luminance level, the luminance level can be easily controlled so as to obtain an excellent luminance level.

For example, the luminance control means may control the luminance level such that at least a part of the rim shoulder and at least a part of the slope of the groove of the rim in the eyeglass frame can be detected. For example, the rim shoulder may be the front rim shoulder and the rear rim shoulder. More preferably, the luminance control means may control the luminance level such that the end portion of the rim shoulder is detected. For example, the slope of the groove of the rim may be the front slope of the groove of the rim and the rear slope of the groove of the rim. As described above, the cross-sectional shape of the rim can be acquired by detecting at least a part of the rim shoulder and at least a part of the slope of the groove of the rim.

For example, the luminance level of the reflected light may be detected from the signal of the reflected light. In this case, for example, the luminance control means may control the luminance level based on the luminance level detected from the signal of the reflected light.

Further, for example, the luminance level of the reflected light may be detected from the cross-sectional image by acquiring the cross-sectional image from the signal of the reflected light. In this case, for example, the acquisition means may acquire the cross-sectional image as a cross-sectional shape. Further, for example, the eyeglass frame shape measurement device may include luminance analysis means (for example, control portion 50) for detecting the luminance level from the cross-sectional image. For example, the luminance control means may control the luminance level based on the luminance level detected by the luminance analysis means. For example, in a case where the luminance analysis means detects the luminance level from the cross-sectional image, the luminance level may be detected from at least a part of the cross-sectional image. For example, the part may be at least a part of the rim shoulder and at least a part of the slope of the groove of the rim. Accordingly, for example, since the luminance level can be controlled based on the acquired cross-sectional image, the luminance level can be easily and accurately controlled. It is needless to say that the luminance level of the reflected light may be detected by a configuration different from the above-described configuration.

For example, as a configuration for controlling the luminance level based on the luminance level of the reflected light received by the detector, a configuration for performing the control based on whether or not the luminance level of the reflected light received by the detector satisfies an acceptable level (for example, a predetermined threshold value) may be employed. In this case, for example, the luminance control means may control the luminance level such that the luminance level satisfies the acceptable level in a case where the luminance level of the reflected light received by the detector has not reached the acceptable level.

For example, as a configuration for controlling the luminance level based on the luminance level of the reflected light received by the detector, a configuration for performing the control by determining whether or not the luminance level of the reflected light received by the detector satisfies an acceptable level (for example, a predetermined threshold value) may be employed. In this case, for example, the eyeglass frame shape measurement device includes determination means (for example, control portion 50) for determining whether or not the luminance level is an acceptable level, and the luminance control means may control the luminance level based on the determination result of the determination means. Accordingly, for example, since the luminance level is controlled based on whether or not the luminance level of the reflected light is a luminance level at which the cross-sectional shape of the groove of the rim can be acquired excellently, the luminance level can be controlled more precisely. In other words, the luminance level can be controlled with higher accuracy.

For example, the above-described acceptable level may be a preset acceptable level. For example, an acceptable level at which the luminance level is determined to be excellent by a simulation or an experiment may be set in advance. As an example, the acceptable level may be set to be a luminance level at which at least a part of the rim shoulder and at least a part of the slope of the groove of the rim in the eyeglass frame can be detected. For example, the acceptable level may be configured to be any acceptable level that can be set by the examiner. Further, for example, the acceptable level may be set based on the acquired cross-sectional image.

For example, as a configuration in which the luminance control means controls the luminance level, the luminance control means may control the luminance level by operating the operation portion (for example, switch portion 4) by the operator. In this case, for example, the eyeglass frame shape measurement device includes receiving means for receiving an operation signal for changing the luminance level from the operation portion, and the luminance control means may control the luminance level based on the operation signal received by the receiving means. In addition, in a case where the luminance level operation is performed by the operator, guide information for assisting the luminance level operation may be presented. For example, the guide information may be at least one of warning information indicating that the luminance level does not satisfy the acceptable level, information prompting to confirm the luminance level, information indicating the luminance level, information indicating the acceptable level, and the like. It is needless to say that the guide information is not limited to the above-described configuration, and may be information that makes it possible to confirm whether or not the luminance level satisfies the acceptable level.

For example, as a configuration in which the luminance control means controls the luminance level, the luminance control means may control the luminance level based on eyeglass frame type information. In this case, eyeglass frame type information acquisition means for acquiring the eyeglass frame type information may be provided, and the luminance control means may control the luminance level based on the eyeglass frame type information acquired by the eyeglass frame type information acquisition means. In other words, for example, the luminance control means may set the eyeglass frame type information acquired by the eyeglass frame type information acquisition means as information for controlling the luminance level, and may control the luminance level based on the set eyeglass frame type information. With such a configuration, for example, it is possible to control the luminance level that corresponds to the eyeglass frame type, and without performing analysis processing, such as image processing, regardless of the eyeglass frame type, the cross-sectional shape of the rim of the eyeglass frame can be acquired easily and accurately.

For example, the eyeglass frame type in the eyeglass frame type information may be at least one of the shape of the eyeglass frame, the material of the eyeglass frame, the color of the eyeglass frame, the design of the eyeglass frame, the configuration information of the eyeglass frame, and the like. For example, the shape of the eyeglass frame may be any shape, such as Full lim, Two point, Nylor. It is needless to say that the shape of the eyeglass frame may be different from the above-described shape. Further, for example, the material of the eyeglass frame may be any of Metal, Plastic, Optyl, and the like. It is needless to say that the material of the eyeglass frame may be different from the above-described material. Further, for example, the color of the eyeglass frame may be at least one of red, blue, yellow, black, gray, and the like. It is needless to say that the color of the eyeglass frame may be different from the above-described color. For example, the design of the eyeglass frame may be at least one of dots, borders, and the like. It is needless to say that the design of the eyeglass frame may be different from the above-described design. For example, the configuration information of the eyeglass frame may be at least one of a lens shape of the eyeglass frame, a camber angle of the eyeglass frame, a forward tilt angle of the eyeglass frame, and the like. It is needless to say that the configuration information of the eyeglass frame may be different from the above-described configuration information.

For example, as Full rim, a type of an eyeglass frame having a rim (edge) as a whole can be employed. Further, for example, as Two point, a rimless eyeglass frame in which a temple or a bridge is directly attached to the eyeglass lens can be employed. Further, for example, as Nylor, an eyeglass frame of a type that does not have a rim partially can be employed. In this case, at the rimless part, the eyeglass lens is fixed with nylon thread or the like.

In addition, the eyeglass frame type information may be associated with a plurality of pieces of eyeglass frame type information. In this case, for example, when a predetermined eyeglass frame type (for example, the shape of the eyeglass frame) is selected, in addition to the selected eyeglass frame type, other eyeglass frame types (for example, materials of the eyeglass frame) may be acquired. For example, in a case where any material of the eyeglass frame, such as metal, plastic, or optic, is selected, the shape of the eyeglass frame may be acquired as Full rim. In this case, the eyeglass frame types may be associated with each other in advance.

In addition, the eyeglass frame types are not limited to these types, and various types of eyeglass frame can be set. It is needless to say that the eyeglass frame type may be configured to be added or deleted in any manner by the examiner.

For example, as the eyeglass frame type information acquisition means, a configuration input by the operation of the examiner can be employed. For example, as an input by the examiner, a configuration for directly inputting the eyeglass frame type information as the examiner operates the operation portion, or a configuration for selecting the eyeglass frame type information as the examiner operates the operation portion by the eyeglass frame type information stored in the memory of the eyeglass frame shape measurement device, can be employed. Further, for example, as the eyeglass frame type information acquisition means, in the eyeglass frame shape measurement device, frame detection means for detecting the eyeglass frame may be provided, and based on the detection result (for example, the thickness of the eyeglass frame) of the frame detection means, the eyeglass frame type information may be acquired. Further, for example, as a configuration for acquiring the eyeglass frame type information, a configuration in which the eyeglass frame type information input by a separate device different from the eyeglass frame shape measurement device is received by the receiving means can be employed.

For example, as a configuration in which the luminance control means controls the luminance level, the luminance control means may control the luminance level based on a measurement position in the eyeglass frame. In this case, for example, the luminance control means may detect the irradiation position of the measurement light, and control the luminance level in accordance with the irradiation position (for example, a bridge peripheral position, a crane peripheral position, and the like) of the measurement light.

For example, in a case of controlling the luminance level, the luminance control means may be implemented before starting the measurement. In this case, for example, after the luminance level is controlled to be changed by the luminance control means, the acquisition means acquires the cross-sectional shape of the groove of the rim of the eyeglass frame based on the reflected light received by the detector. As an example, for example, pre-measurement in which the measurement light is irradiated and the reflected light is received is performed at least at one measurement position in the eyeglass frame in advance. For example, the luminance control means controls the luminance level based on the luminance level of the reflected light acquired by the pre-measurement. For example, after the luminance level is controlled to be changed by the luminance control means, the acquisition means acquires the cross-sectional shape of the groove of the rim of the eyeglass frame based on the reflected light received by the detector. Accordingly, for example, since the cross-sectional shape after the luminance level is changed can be acquired, an excellent cross-sectional shape can be acquired. In the pre-measurement, the measurement may be performed at the same measurement position (number of points) as the main measurement. In this case, for example, a measurement position where the luminance level is not excellent may be detected in advance from the result of the pre-measurement, and the luminance level may be controlled at the measurement position where the luminance level is not excellent during the main measurement.

Further, for example, in a case of controlling the luminance level, the luminance control means may be implemented after starting the measurement. For example, after the main measurement of the eyeglass frame is started, the luminance level is controlled based on the luminance level of the reflected light acquired by the measurement. For example, in a case where the luminance level is controlled during the main measurement, the luminance level may be controlled based on the luminance level of the reflected light at least at one measurement position. As an example, the luminance level of the reflected light at least at one measurement position may be detected, and the luminance level may be controlled based on the detected luminance level. In this case, for example, only the luminance level at the measurement position where the luminance level is detected may be controlled, or the luminance level at all measurement positions in the main measurement may be controlled. In addition, the luminance level is detected, and the luminance level is controlled in a case where the luminance level is not excellent. In this case, after the control of the luminance level control, the measurement may be performed again, and the measurement result before the luminance level control may be replaced with the measurement result after the luminance level control. As an example, for example, in a case of controlling the luminance level at all measurement positions where the measurement is performed, the luminance level may be detected at each measurement position, the measurement may be performed again at a position where the luminance level is not excellent, and the measurement result may be replaced with the measurement result after the control of the luminance level. It is needless to say that the measurement result may be replaced in a case where the measurement is performed again at another position where the luminance level is not excellent.

In addition, the timing at which the luminance control means controls the luminance level is not limited to the above-described timing. For example, the luminance level may be controlled at a timing different from the above-described timing. As an example, in a case of controlling the luminance level, the luminance control means may control the luminance level both before starting the measurement and after starting the measurement.

In addition, for example, a configuration in which at least one of the acquisition means, the first control means, the second control means, the analysis means, the luminance control means, the luminance analysis means, and the determination means is used may be employed. In addition, for example, a configuration in which the acquisition means, the first control means, the second control means, and the analysis means are separately provided may be employed.

<Lens Processing>

For example, the cross-sectional shape of the groove of the rim of the eyeglass frame acquired by the eyeglass frame shape measurement device may be used for processing the lens. For example, a lens processing device (for example, lens processing device 300) for processing the peripheral edge of the lens acquires the cross-sectional shape of the groove of the rim of the eyeglass frame acquired by the eyeglass frame shape measurement device.

For example, the eyeglass frame shape measurement device may include transmission means, and the transmission means may transmit the cross-sectional shape of the groove of the rim of the eyeglass frame toward the lens processing device. In this case, for example, the lens processing device may have the receiving means and receive the cross-sectional shape of the groove of the rim of the eyeglass frame transmitted from the eyeglass frame shape measurement device.

In addition, for example, a configuration in which the eyeglass frame shape measurement device is provided in the lens processing device may be employed. In addition, for example, the lens processing device and the eyeglass frame shape measurement device may be devices separated from each other. In this case, the cross-sectional shape of the groove of the rim of the eyeglass frame may be transmitted from the eyeglass frame shape measurement device to the lens processing device at least in any one of the wired and wireless manner.

For example, the lens processing device may include processing control means (for example, control portion 310). For example, the processing control means may process the peripheral edge of the lens based on the cross-sectional shape of the groove of the rim of the eyeglass frame acquired by the eyeglass frame shape measurement device. For example, the processing control means may control the lens holding means and the processing tool for holding the lens and process the peripheral edge of the lens based on the cross-sectional shape of the groove of the rim of the eyeglass frame.

For example, in the present embodiment, the lens processing device includes processing control means for processing the peripheral edge of the lens based on the cross-sectional shape of the groove of the rim of the eyeglass frame. Accordingly, when the processed lens is excellently framed into the eyeglass frame, the shape of the groove of the rim and the contour shape of the processed lens are close to each other, and thus, the framing can be excellently performed.

Example

Figure 2:
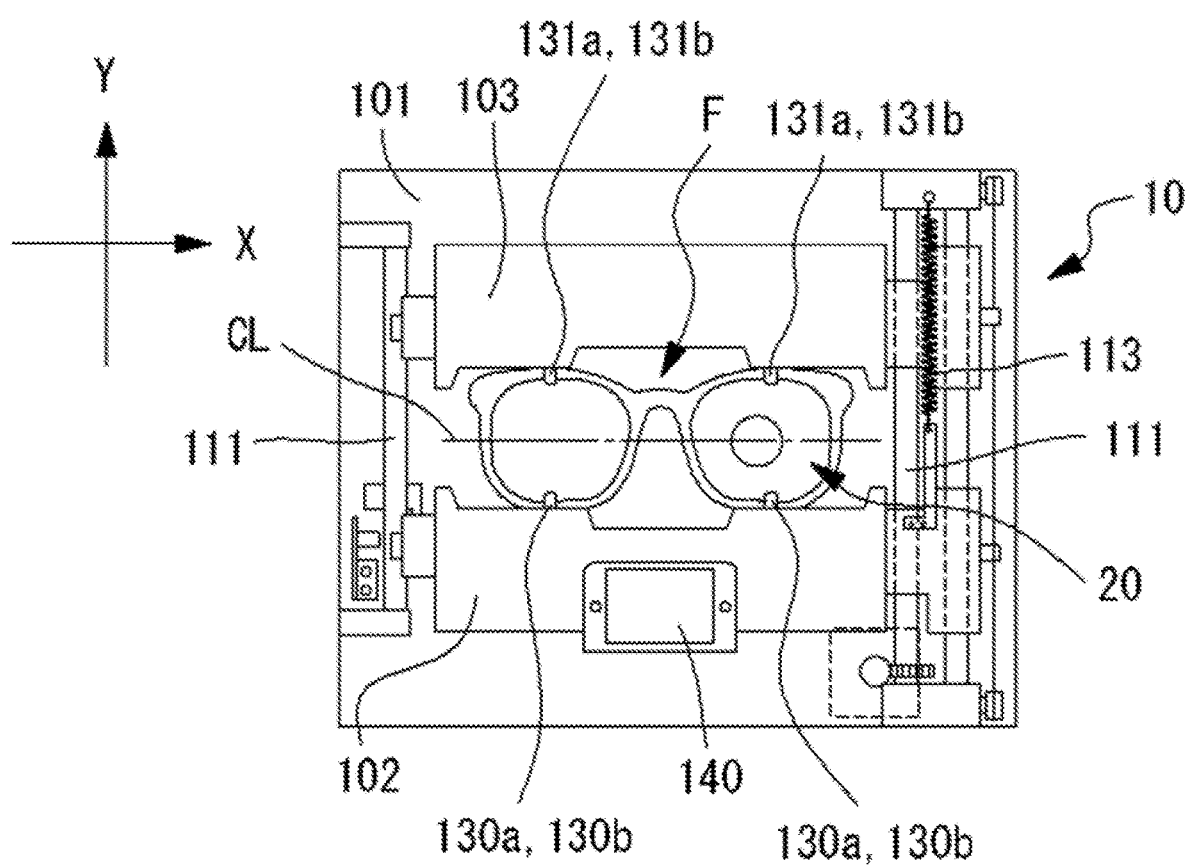
FIG. 2 is a top view of a frame holding unit in a state where an eyeglass frame is held.

One typical example of the present disclosure will be described with reference to the drawings. FIG. 1 is a schematic external view of the eyeglass frame shape measurement device. For example, FIG. 2 is a top view of a frame holding unit in a state where the eyeglass frame is held. For example, in the present example, the eyeglass frame shape measurement device 1 includes a frame holding unit 10 and a measurement unit 20. For example, the frame holding unit 10 holds the eyeglass frame F in a desired state. For example, by emitting the measurement light toward the groove of the rim (for example, left rim FL and right rim FRO of the eyeglass frame F held by the frame holding unit 10, and receiving the reflected light, the measurement unit 20 is used for acquiring the cross-sectional shape of the groove of the rim of the eyeglass frame F. For example, the measurement unit 20 is disposed under the frame holding unit 10.

For example, the switch portion 4 having a measurement start switch and the like is disposed on the front side of the housing of the eyeglass frame shape measurement device 1. For example, a touch panel type display 3 is disposed on the rear side of the housing of the eyeglass frame shape measurement device 1. For example, when processing the peripheral edge of the lens, lens layout data for the lens shape data, lens processing conditions, and the like are input through the touch panel type display 3. For example, the acquisition results (cross-sectional shape of the groove of the rim, eyeglass frame shape, and the like) obtained by the eyeglass frame shape measurement device 1 and the data input on the display 3 are transmitted to the lens processing device. In addition, the eyeglass frame shape measurement device 1 may be configured to be incorporated in a lens processing device, as in JP-A-2000-314617.

<Frame Holding Unit>

For example, the measurement unit 20 is provided below the frame holding unit 10. For example, a front slider 102 and a rear slider 103 for holding the eyeglass frame F horizontally are placed on a holding unit base 101. For example, the horizontal may mean substantially horizontal. For example, the front slider 102 and the rear slider 103 are slidably arranged facing each other on two rails 111 with a center line CL as a center, and are always pulled in the direction toward the center line CL of both sliders by a spring 113.

For example, in the front slider 102, clamp pins 130a and 130b for clamping the rim of the eyeglass frame F from the thickness direction are respectively disposed at two locations. For example, in the rear slider 103, clamp pins 131a and 131b for clamping the rim of the eyeglass frame F from the thickness direction are respectively disposed at two locations. For example, when measuring a template, the front slider 102 and the rear slider 103 are opened, and a known template holding jig is disposed at a predetermined mounting position 140 and used. As the configuration of the frame holding unit 10, for example, a known configuration described in JP-A-2000-314617 can be used.

For example, in the eyeglass frame F, the lower side of the rim when wearing the eyeglasses is positioned on the front slider 102 side, and the upper side of the rim is positioned on the rear slider 103 side. For example, the eyeglass frame F is held in a predetermined measurement state by clamp pins positioned on each of the lower side and the upper side of the left and right rims.

In the present example, as a configuration for regulating the position of the rim in the front-rear direction, a configuration of the clamp pins 130a and 130b and the clamp pins 131a and 131b has been described as an example, but the configuration is not limited thereto. A known mechanism may be used. For example, as a mechanism for fixing the front-rear direction of the left and right rims, a configuration in which contact members (regulating members) having a V-shaped groove are respectively provided for the left and right rims may be employed.

<Measurement Unit>

Hereinafter, a configuration of the measurement unit 20 will be described. For example, the measurement unit 20 includes an eyeglass frame measurement optical system 30. For example, the eyeglass frame measurement optical system 30 includes the light projecting optical system 30a and the light receiving optical system 30b. For example, the light projecting optical system 30a and the light receiving optical system 30b are used for acquiring the shape of the eyeglass frame and the cross-sectional shape of the groove of the rim of the eyeglass frame (details will be described later).

For example, the measurement unit 20 includes a holding unit 25 that holds the light projecting optical system 30a and the light receiving optical system 30b. For example, the measurement unit 20 includes the moving unit 210 that moves the holding unit 25 in the XYZ directions (refer to, for example, FIGS. 3 to 5). For example, the measurement unit 20 includes a rotation unit 260 that rotates the holding unit 25 with a rotation shaft L0 as a center (refer to, for example, FIG. 6). For example, in the present example, the XY direction is a direction parallel to the measurement plane (the radius vector direction of the rim) of the eyeglass frame F held by the frame holding unit 10, and the Z direction is a direction orthogonal to the measurement plane.

<Moving Unit>

Figure 3:
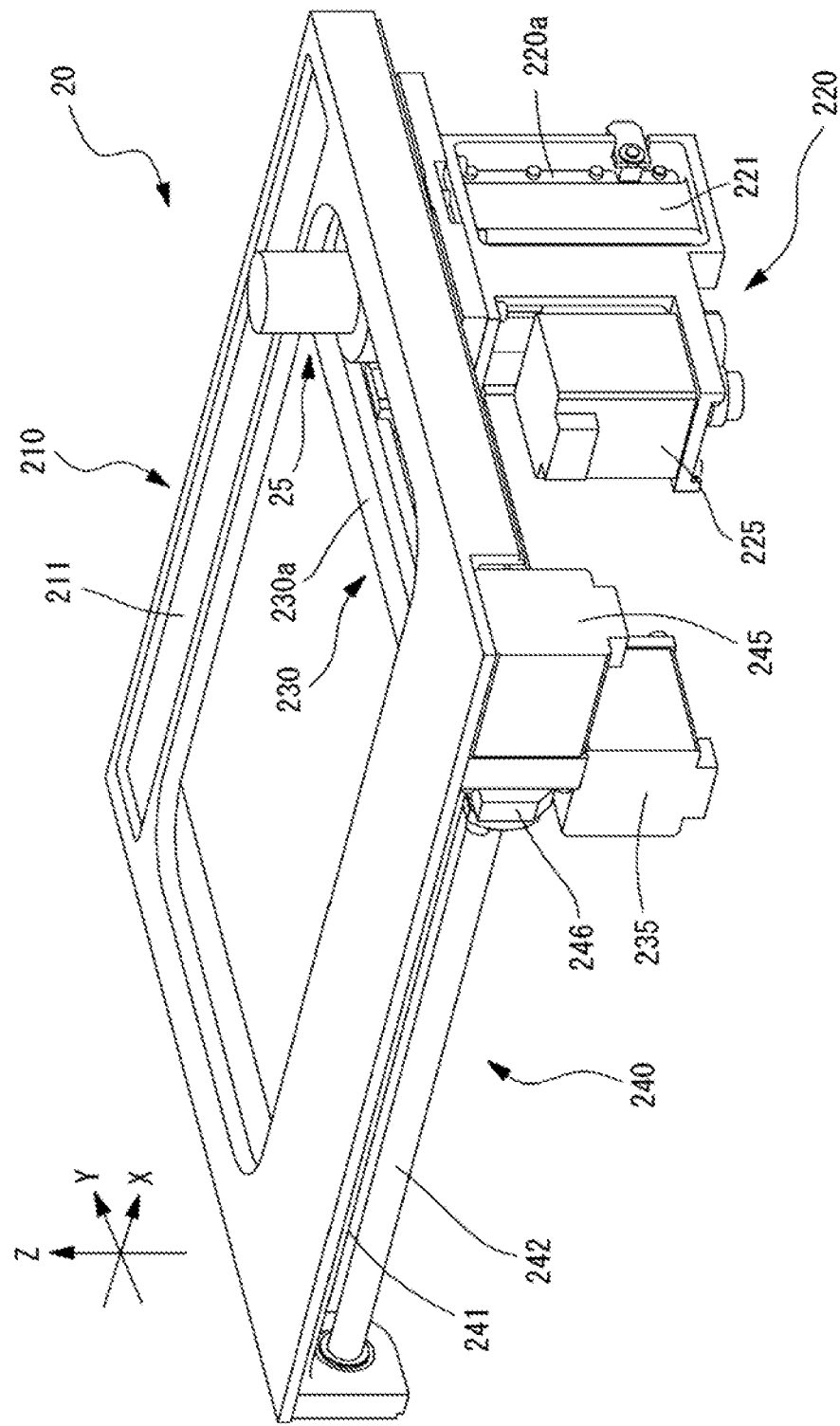
FIG. 3 illustrates a perspective view of a moving unit when viewed from above.
Figure 4:
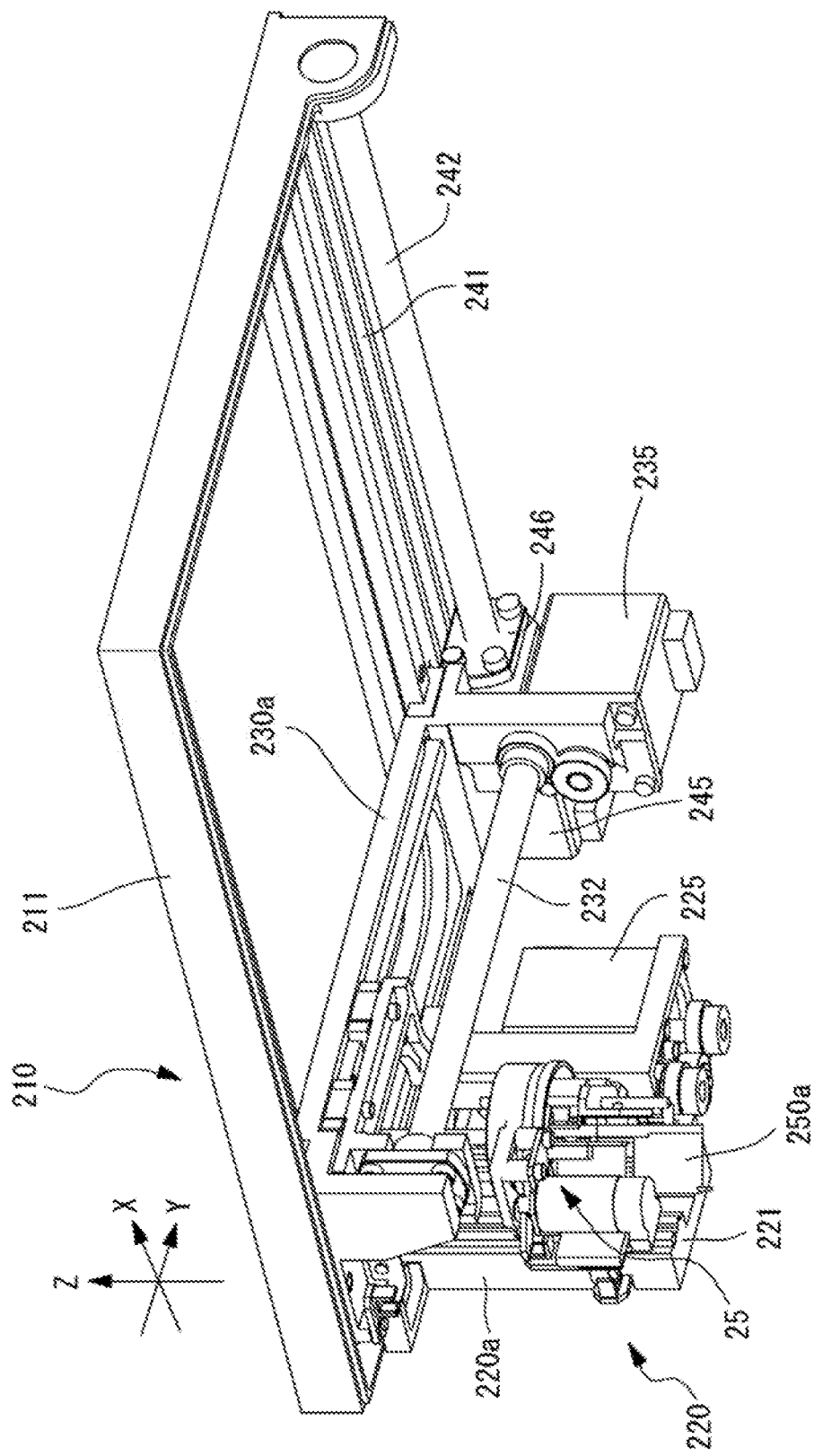
FIG. 4 illustrates a perspective view of the moving unit when viewed from below.
Figure 5:
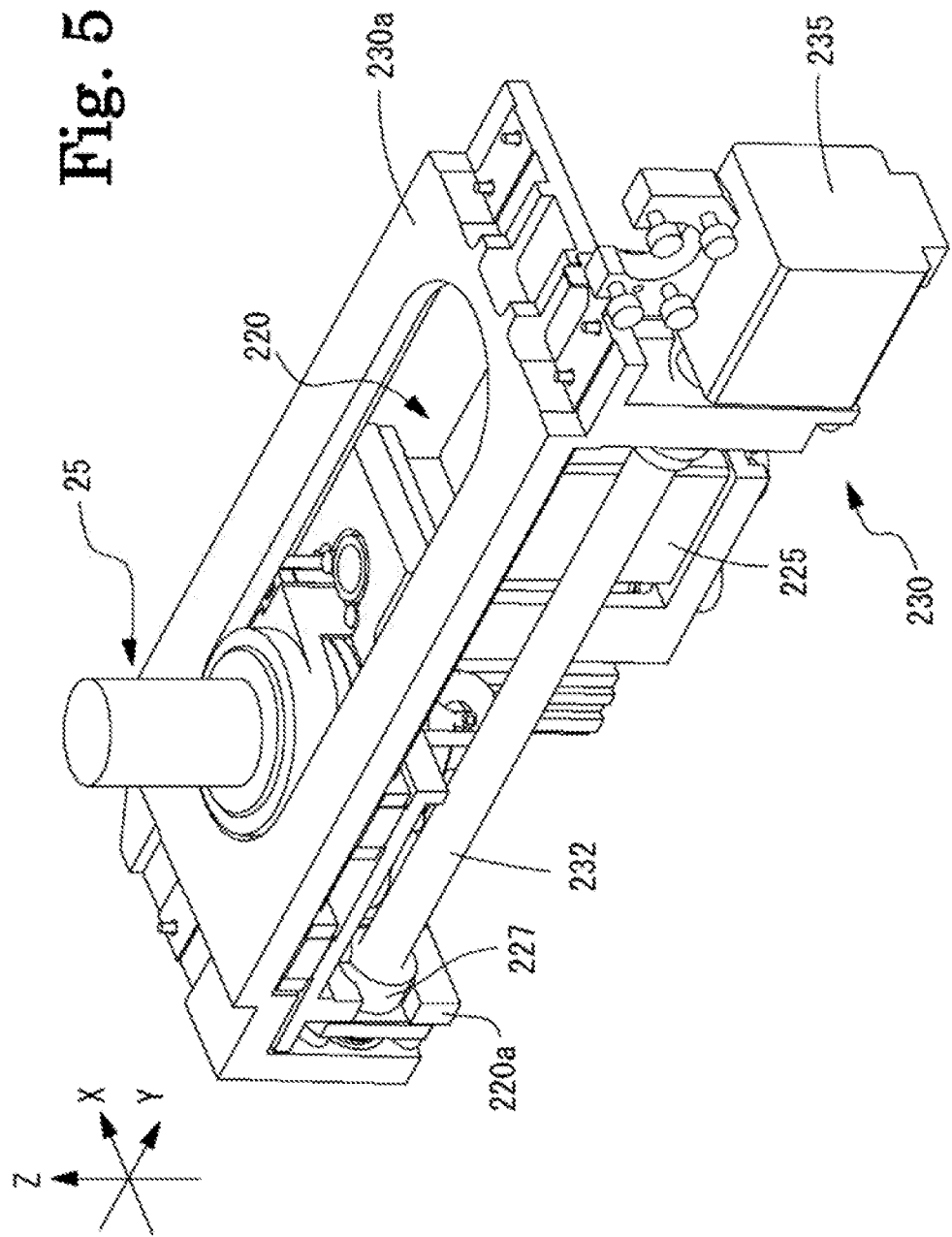
FIG. 5 is a top perspective view of a Z moving unit and a Y moving unit.

Hereinafter, the moving unit 210 will be described. For example, FIGS. 3 to 5 are views for describing the configuration of the moving unit 210. For example, FIG. 3 illustrates a perspective view of the moving unit 210 when viewed from above. For example, FIG. 4 illustrates a perspective view of the moving unit 210 when viewed from below. For example, FIG. 5 illustrates a top perspective view of a Z moving unit 220 and a Y moving unit 230 (a perspective view in a state where an X moving unit 240 and a base portion 211 are removed).

For example, the moving unit 210 roughly includes the Z moving unit (Z-direction driving means) 220, the Y moving unit (Y-direction driving means) 230, and the X moving unit (X-direction driving means) 240. For example, the Z moving unit (Z-direction driving means) 220 moves the holding unit 25 in the Z direction. For example, the Y moving unit 230 holds and moves the holding unit 25 and the Z moving unit 220 in the Y direction. For example, the X moving unit 240 moves the holding unit 25 in the X direction together with the Z moving unit 220 and the Y moving unit 230.

For example, the X moving unit 240 is schematically configured as follows. For example, the X moving unit 240 includes a guide rail 241 that extends in the X direction below the base portion 211 having a rectangular frame that stretches in the horizontal direction (XY direction). For example, a Y base 230a of the Y moving unit 230 is attached along the guide rail 241 so as to be movable in the X direction. For example, a motor (drive source) 245 is attached to the base portion 211. For example, a feed screw 242 that extends in the X direction is attached to the rotation shaft of the motor 245. For example, a nut portion 246 fixed to the Y base 230a is screwed to the feed screw 242. Accordingly, when the motor 245 is rotated, the Y base 230a is moved in the X direction. For example, the movement range in the X direction of the X moving unit 240 may have a length by which the Y base 230a with the holding unit 25 mounted thereon can be moved more than the horizontal width of the eyeglass frame in order to enable the measurement of the left and right lens frames of the eyeglass frame.

For example, the Y moving unit 230 is schematically configured as follows. For example, a guide rail 231 that extends in the Y direction is attached to the Y base 230a. For example, a Z base 220a is attached along the guide rail 231 so as to be movable in the Y direction. For example, a Y movement motor (drive source) 235 and a feed screw 232 that extends in the Y direction are rotatably attached to the Y base 230a. For example, the rotation of the motor 235 is transmitted to the feed screw 232 via a rotation transmission mechanism, such as a gear. For example, a nut 227 attached to the Z base 220a is screwed to the feed screw 232. With these configurations, when the motor 235 is rotated, the Z base 220a is moved in the Y direction.

For example, the X moving unit 240 and the Y moving unit 230 configure an XY moving unit. For example, the range in which the holding unit 25 is moved in the XY directions is larger than the measurable rim radius vector. For example, the movement position of the holding unit 25 in the XY direction is detected by the number of pulses by which the motors 245 and 235 are driven by the control portion 50 which will be described later, and a first XY position detection unit that detects the position of the holding unit 25 in the XY direction is configured with the motors 245 and 235 and the control portion 50. For example, the XY position detection unit of the holding unit 25 may be configured to use sensors, such as encoders attached to each of the rotation shafts of the motors 245 and 235 in addition to detection by pulse control of the motors 245 and 235.

For example, the Z moving unit 220 is schematically configured as follows. For example, a guide rail 221 that extends in the Z direction is formed on the Z base 220a, and a moving base 250a to which the holding unit 25 is attached is held along the guide rail 221 so as to be movable in the Z direction. For example, a pulse motor 225 for Z movement is attached to the Z base 220a, and a feed screw (not illustrated) that extends in the Z direction is rotatably attached. For example, it is screwed into a nut attached to the base 250a of the holding unit 25. For example, the rotation of the motor 225 is transmitted to a feed screw 222 via a rotation transmission mechanism, such as a gear, and the holding unit 25 is moved in the Z direction by the rotation of the feed screw 222. The movement position of the holding unit 25 in the Z direction is detected by the number of pulses by which the motor 225 is driven by the control portion 50 which will be described later, and a Z position detection unit that detects the position of the holding unit 25 in the Z direction is configured with the motor 225 and the control portion 50. For example, the Z position detection unit of the holding unit 25 may be configured to use sensors, such as encoders attached to the rotation shaft of the motor 225 in addition to detection by pulse control of the motor 225.

In addition, each moving mechanism in the X direction, the Y direction, and the Z direction as described above is not limited to the example, and a known mechanism can be adopted. For example, instead of moving the holding unit 25 in a straight line, a configuration in which the holding unit 25 is moved by starting an arc with respect to the center of the rotation base may be employed (refer to, for example, JP-A-2006-350264).

<Rotation Unit>

Figure 6:
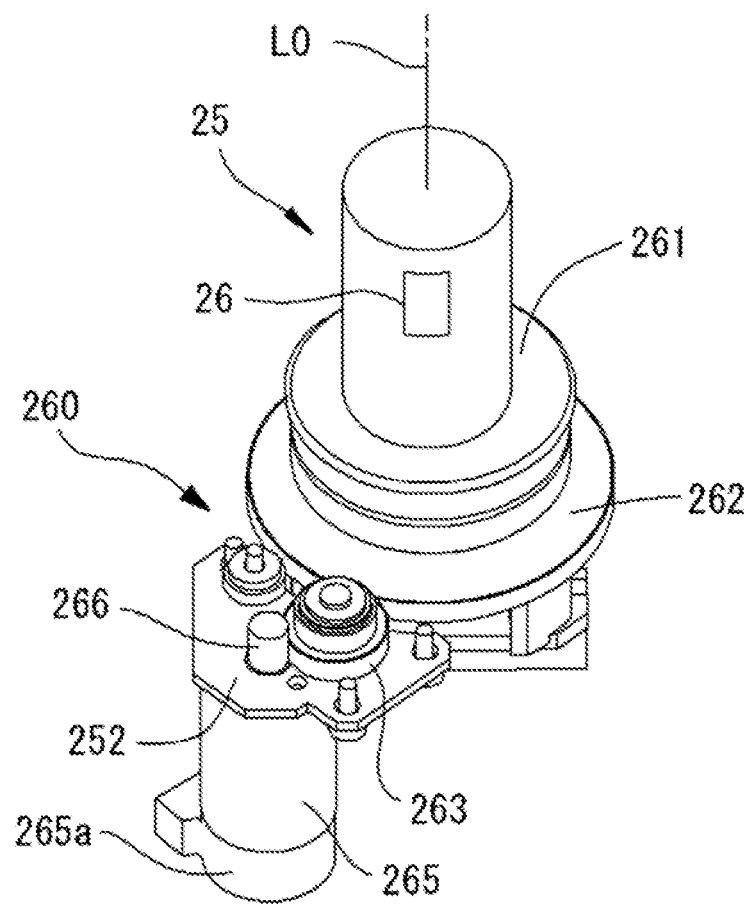
FIG. 6 is a view for describing a rotation unit.

Next, the rotation unit 260 will be described. For example, FIG. 6 is a view illustrating the rotation unit 260.

For example, the holding unit 25 is provided with an opening portion 26. For example, the opening portion 26 allows the measurement light from the light projecting optical system 30a to pass and allows the reflected light reflected by the eyeglass frame F to pass. For example, the opening portion 26 may be provided with a transparent panel that covers the opening portion 26. For example, the opening portion 26 emits the measurement light emitted from the light projecting optical system 30a from the inside of the holding unit 25 to the outside. In other words, the measurement light from the light projecting optical system 30a passes through the opening portion 26 and is emitted toward the groove of the rim of the eyeglass frame F. For example, the opening portion 26 allows the reflected light reflected by the groove of the rim of the eyeglass frame F to pass from the outside of the holding unit 25 toward the light receiving optical system 30b inside the holding unit 25. In other words, the reflected light reflected by the groove of the rim of the eyeglass frame F passes through the opening portion 26 and is received by the light receiving optical system 30b.

For example, the rotation unit 260 changes the XY direction in which the opening portion 26 faces by rotating the holding unit 25 with the rotation shaft LO that extends in the Z direction as a center. For example, the rotation unit 260 includes a rotation base 261. For example, the holding unit 25 is attached to the rotation base 261. For example, the rotation base 261 is held rotatably with the rotation shaft LO that extends in the Z direction as a center. For example, a large-diameter gear 262 is formed at the outer periphery of the lower portion of the rotation base 261. For example, the rotation unit 260 has an attachment plate 252. For example, a motor (drive source) 265 is attached to the attachment plate 252. For example, a pinion gear 266 is fixed to the rotation shaft of the motor 265, and the rotation of the pinion gear 266 is transmitted to the large-diameter gear 262 via a gear 263 that is rotatably provided on the attachment plate 252. Therefore, the rotation base 261 is rotated around the rotation shaft LO by the rotation of the motor 265. For example, the rotation of the motor 265 is detected by an encoder (sensor) 265a integrally attached to the motor 265, and the rotation angle of the rotation base 261 (that is, holding unit 25) is detected from the output of the encoder 265a. The origin position of the rotation of the rotation base 261 is detected by an origin position sensor (not illustrated). In addition, each moving mechanism of the above rotation units 260 is not limited to the example, and a known mechanism can be employed.

In the present example, the rotation shaft LO of the rotation unit 260 is set as a shaft that passes through the light source 31 of the light projecting optical system 30a which will be described later. In other words, the rotation unit 260 rotates with the light source 31 of the light projecting optical system 30a as a center. It is needless to say that the rotation shaft of the rotation unit 260 may be a rotation shaft at a different position. For example, the rotation shaft LO of the rotation unit 260 may be set to a shaft that passes through the detector 37 of the light receiving optical system 30*b* which will be described later.

<Eyeglass Frame Measurement Optical System>

Figure 7:
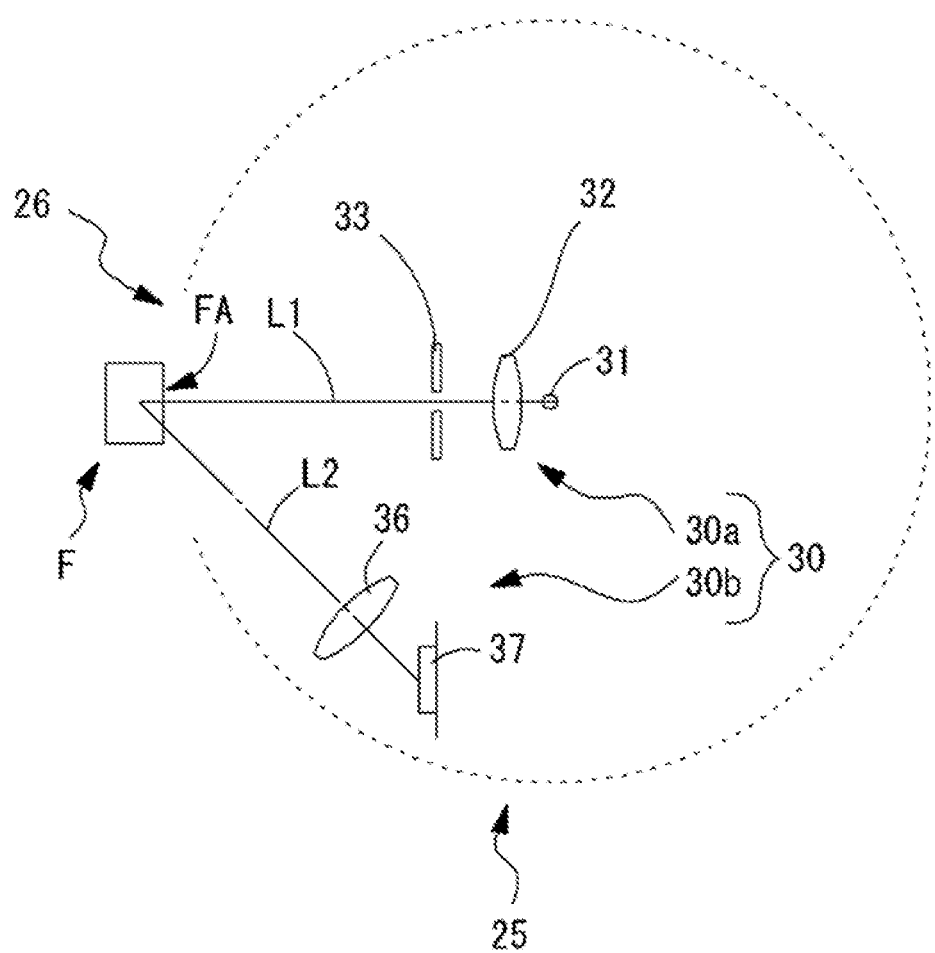
FIG. 7 is a schematic configuration view illustrating an eyeglass frame measurement optical system.

Next, the eyeglass frame measurement optical system 30 held by the holding unit 25 will be described. For example, FIG. 7 is a schematic configuration view illustrating the eyeglass frame measurement optical system 30. For example, the eyeglass frame measurement optical system 30 is used for acquiring the eyeglass frame F. For example, in the present example, the eyeglass frame measurement optical system 30 is used for acquiring the cross-sectional shape of the groove of the rim of the eyeglass frame F. In addition, for example, in the present example, the eyeglass frame measurement optical system 30 is used for measuring the shape of the eyeglass frame F.

For example, in the present example, the eyeglass frame measurement optical system 30 is disposed inside the holding unit 25. For example, the eyeglass frame measurement optical system 30 is configured with the light projecting optical system 30*a* and the light receiving optical system 30*b*. For example, the light projecting optical system 30*a* has the light source and emits the measurement light from the light source toward the groove of the rim of the eyeglass frame F. For example, the light receiving optical system 30*b* has the detector and causes the detector to receive the reflected light of the measurement light emitted toward the groove of the rim of the eyeglass frame F by the light projecting optical system 30*a* and reflected by the groove of the rim of the eyeglass frame F.

For example, in the present example, the eyeglass frame measurement optical system 30 is configured to acquire the cross-sectional shape of the groove of the rim of the eyeglass frame F based on the Scheimpflug principle. For example, the light projecting optical system 30*a* irradiates the groove of the rim of the eyeglass frame with slit light. For example, the light receiving optical system 30*b* has the optical axis L2 inclined with respect to the optical axis L1 irradiated with the slit light, and includes a lens and a detector that are arranged based on the Scheimpflug principle. It is needless to say that the eyeglass frame measurement optical system 30 may be an optical system having a different configuration instead of an optical system based on the Scheimpflug principle. The eyeglass frame measurement optical system 30 may be an optical system that acquires the cross-sectional shape of the groove of the rim of the eyeglass frame F.

In the example, a configuration in which the light projecting optical system 30*a* and the light receiving optical system 30*b* are integrally moved is described as an example, but the present disclosure is not limited thereto. For example, at least in any one of the driving means among the X moving unit 240, the Y moving unit 230, the Z moving unit 220, and the rotation unit 260, the light projecting optical system 30*a* and the light receiving optical system 30*b* may be configured to be separately moved.

<Light Projecting Optical System>

For example, the light projecting optical system 30*a* includes the light source 31, a lens 32, and a slit plate 33. For example, the measurement light emitted from the light source 31 is condensed by the lens 32 and illuminates the slit plate 33. For example, the measurement light that illuminates the slit plate 33 becomes the measurement light limited to a narrow slit-shaped by the slit plate 33 and is emitted onto a groove FA of the rim of the eyeglass frame F. In other words, for example, slit light is emitted to the groove FA of the rim of the eyeglass frame F. Accordingly, the groove FA of the rim of the eyeglass frame F is illuminated in the form of being light-cut by the slit light.

<Light Receiving Optical System>

For example, the light receiving optical system 30*b* includes a lens 36 and a detector (for example, light receiving element) 37. For example, the light receiving optical system 30*b* is configured to acquire the cross-sectional shape from an oblique direction with respect to the groove FA of the rim of the eyeglass frame F. For example, the light receiving optical system 30*b* is configured to acquire the cross-sectional shape of the groove FA of the rim of the eyeglass frame F based on the Scheimpflug principle.

For example, the lens 36 leads the reflected light (for example, scattered light from the groove FA of the rim, regular reflected light from the groove FA of the rim, and the like) from the groove FA of the rim acquired by the reflection at the groove FA of the rim to the detector 37. For example, the detector 37 has a light receiving surface disposed at a position substantially conjugating with the groove FA of the rim of the eyeglass frame F. For example, the light receiving optical system 30*b* has the imaging optical axis L2 that is inclined with respect to the light projecting optical axis L1 of the light projecting optical system 30*a*, and has the lens 36 and the detector 37 that are disposed based on the Scheimpflug principle. The light receiving optical system 30*b* is disposed such that the optical axis (imaging optical axis) L2 intersects with the optical axis L1 of the light projecting optical system 30*a* at a predetermined angle. For example, a cross section of light emitted onto the groove FA of the rim of the eyeglass frame F by the light projecting optical system 30*a*, and a light receiving surface (light receiving position) of a lens system (the groove FA of the rim of the eyeglass frame F and the lens 36) including the groove FA of the rim of the eyeglass frame F and the detector 37 are disposed in the Scheimpflug relationship.

<Control Means>

Figure 8:
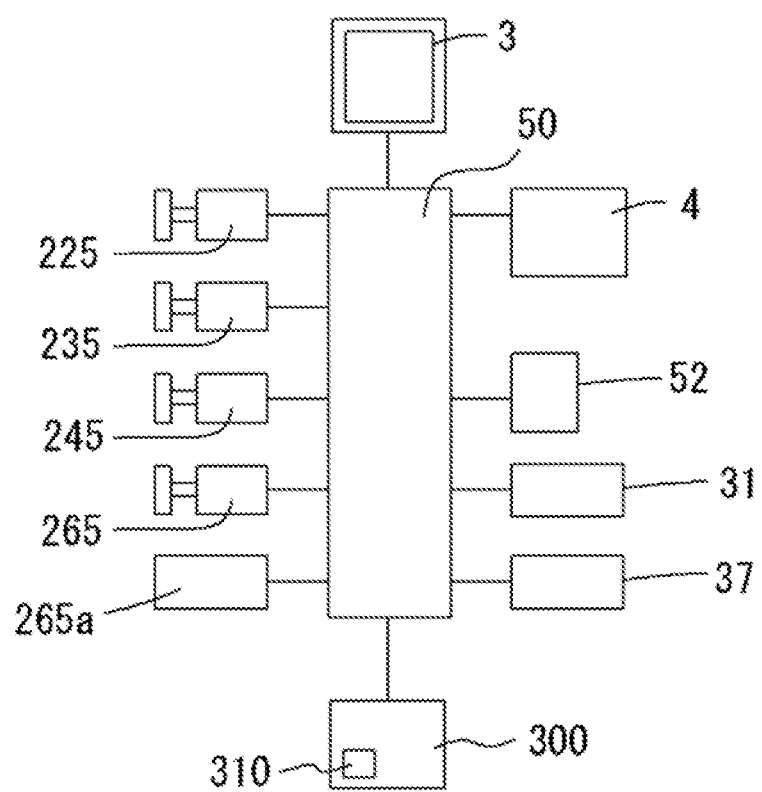
FIG. 8 is a control block diagram related to the eyeglass frame shape measurement device.

FIG. 8 is a control block diagram related to the eyeglass frame shape measurement device 1. The control portion 50 is connected to a non-volatile memory (storage means) 52, the display 3, the switch portion 4, and the like.

For example, the control portion 50 includes a CPU (processor), a RAM, a ROM, and the like. The CPU of the control portion 50 controls the entire device, such as each unit (for example, the light source 31, the detector 37, the encoder 265*a*) and driving means (for example, the drive source of the frame holding unit 100, each of the motors 225, 235, 245, and 265, and the like) for each unit. Further, for example, the control portion 50 functions as arithmetic means (analysis means) for performing various arithmetic operations (for example, calculation of the shape of the eyeglass frame based on output signals from each sensor). The RAM temporarily stores various pieces of information. Various programs for controlling the operation of the entire device, initial values, and the like are stored in the ROM of the control portion 50. The control portion 50 may be configured with a plurality of control portions (that is, a plurality of processors). The non-volatile memory (storage means) 52 is a non-transitory storage medium that can hold stored contents even when power supply is interrupted. For example, a hard disk drive, a flash ROM, a USB memory or the like that is detachably attached to the eyeglass frame shape measurement device 1 can be used as the non-volatile memory (memory) 52.

For example, the control portion 50 is connected to the lens processing device 300 that processes the peripheral edge of the lens. For example, various pieces of data acquired by the eyeglass frame shape measurement device 1 are transmitted to the control portion 310 of the lens processing device 300. The control portion 310 of the lens processing device 300 performs lens processing by controlling each unit of the lens processing device 300 and driving means of each unit based on the received various pieces of data. It is needless to say that the lens processing device 300 and the eyeglass frame shape measurement device 1 may be an integrally configured device.

For example, in the present example, the display 3 is a touch panel type display. In other words, in the present example, since the display 3 is a touch panel, the display 3 functions as an operation portion. In this case, the control portion 50 receives an input signal by a touch panel function of the display 3 and controls display or the like of figures and information on the display 3. It is needless to say that the eyeglass frame shape measurement device 1 may be configured to be provided with the operation portion separately. In this case, for example, at least one of a mouse, a joystick, a keyboard, a touch panel, and the like may be used as the operation portion. It is needless to say that both the display 60 and the operation portion may be used and the eyeglass frame shape measurement device 1 may be operated. In the present example, a configuration in which the display 60 functions as an operation portion and the switch portion (operation portion) 4 is separately provided will be described as an example.

<Control Operation>

The operation of the device having the configuration above will be described. For example, the operator causes the frame holding unit 100 to hold the eyeglass frame F. For example, the operator causes the frame holding unit 100 to hold the eyeglass frame F such that the left and right rims FL and FR of the eyeglass frame F are downward and the left and right temples FTL and FTR of the eyeglass frame F are upward.

For example, when the eyeglass frame F is held by the frame holding unit 100, the operator operates the switch portion 4 to start the measurement. For example, when a trigger signal for starting the measurement is output, the control portion 50 drives at least one of the X moving unit 240, the Y moving unit 230, the Z moving unit 220, and the rotation unit 260 to move the holding unit 25 (the light projecting optical system 30a and the light receiving optical system 30b) and start the measurement of the rim of the eyeglass frame F. For example, in the present example, the measurement of the rim is started from the right rim FR. It is needless to say that the measurement may be started from the left rim FL.

For example, the control portion 50 moves the holding unit 25 and measures the rim contour of the eyeglass frame by the eyeglass frame measurement optical system 30 (the light projecting optical system 30a and the light receiving optical system 30b) to acquire the cross-sectional shape of the groove of the rim of the eyeglass frame. In the present example, the light projecting optical system 30a and the light receiving optical system 30b are moved with respect to the eyeglass frame F in a state where the Scheimpflug relationship is maintained. In other words, the cross-sectional shape of the groove of the rim of the eyeglass frame F can be acquired by moving the eyeglass frame measurement optical system 30 so as to have a certain positional relationship with respect to the groove of the rim of the eyeglass frame F.

For example, when the trigger signal for starting the measurement is output, the control portion 50 controls driving of the moving unit 210 (at least one of the X moving unit 240, the Y moving unit 230, and the Z moving unit 220) and the rotation unit 260, and moves the holding unit 25 placed at a retracted position to the initial position for starting the measurement. For example, at the initial position for starting the measurement, the holding unit 25 is set at the center position of the clamp pins 130a and 130b and the clamp pins 131a and 131b on the lower end side of the right rim FR. It is needless to say that the initial position for starting the measurement can be set to any position.

For example, when the holding unit 25 is moved to the initial position for starting the measurement, the control portion 50 turns on the light source 31. Then, as the light source 31 is turned on, the control portion 50 controls driving of at least one of the moving unit 210 and the rotation unit 260 in order to irradiate the groove of the rim at a predetermined position of the eyeglass frame F with the measurement light.

Figure 9A:
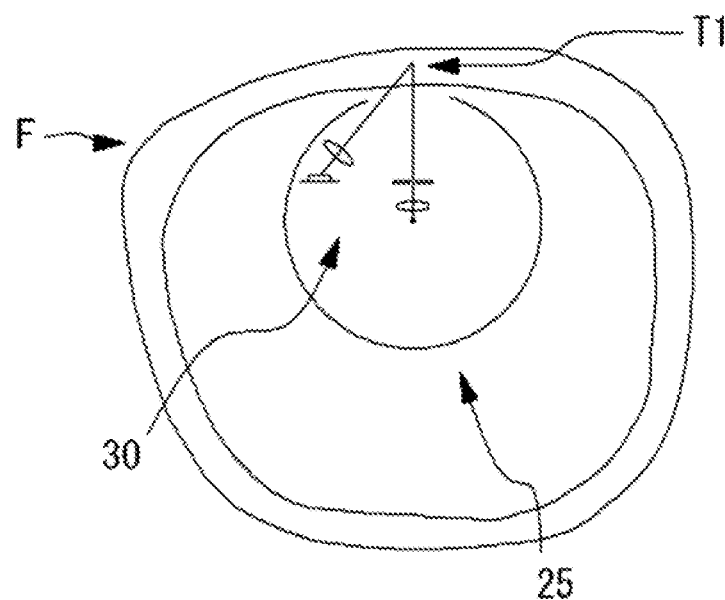
FIG. 9A is a view for describing an example of a case where the rotation unit is controlled to acquire a cross-sectional shape of a rim at a different vector angle.
Figure 9B:
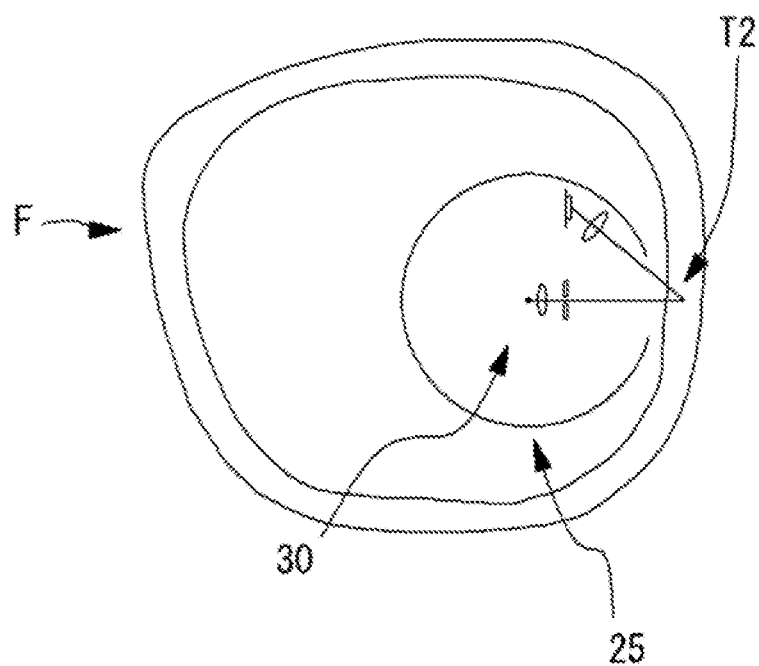
FIG. 9B is a view for describing an example of a case where a cross-sectional shape of the rim at a different vector angle is acquired.

For example, in the present example, in a case of setting the position for acquiring the cross-sectional shape of the groove of the rim, the control portion 50 controls the rotation unit 260 and sets the acquisition position. FIGS. 9A and 9B are views for describing an example of a case where the rotation unit 260 is controlled to acquire the cross-sectional shape of rim at different vector angles. FIGS. 9A and 9B acquire the cross-sectional shape of the rim at different vector angles.

For example, the control portion 50 controls the rotation unit 260 to rotate the optical axis L1 of the light projecting optical system 30a on the XY plane and move the optical axis L1 of the light projecting optical system 30a in the peripheral direction of the rim. In other words, the control portion 50 controls the X rotation unit 260 to change the vector angle for acquiring the cross-sectional shape of the groove of the rim. For example, by controlling the rotation unit 260, an irradiation position T1 of the light projecting optical system 30a is changed to an irradiation position T2 of the light projecting optical system 30a.

For example, in the present example, in a case where the position for acquiring the cross-sectional shape of the groove of the rim is set and the irradiation position of the measurement light with respect to the groove of the rim is changed, the moving unit 210 (at least one of the X moving unit 240, the Y moving unit 230, and the Z moving unit 220) is controlled, and the irradiation position of the measurement light is changed such that the groove of the rim is irradiated with the measurement light.

In the present example, the setting of the position for acquiring the cross-sectional shape of the groove of the rim and the change of the irradiation position of the measurement light with respect to the groove of the rim may be performed simultaneously. Further, for example, not only the rotation unit 260 but also at least one of the X moving unit 240, the Y moving unit 230, and the Z moving unit 220 may be used for setting the position for acquiring the cross-sectional shape of the groove of the rim. Further, the setting of the position for acquiring the cross-sectional shape of the groove of the rim may be performed by at least one of the X moving unit 240, the Y moving unit 230, and the Z moving unit 220. Further, for example, not only at least one of the X moving unit 240, the Y moving unit 230, and the Z moving unit 220 but also the rotation unit 260 may be used for changing the irradiation position of the measurement light with respect to the groove of the rim. Further, for example, only the rotation unit 260 may be used for changing the irradiation position of the measurement light with respect to the groove of the rim.

For example, as the light source 31 is turned on, the groove of the rim of the eyeglass frame F is light-cut by the slit light. The reflected light from the groove of the rim of the eyeglass frame F light-cut by the slit light is directed to the light receiving optical system 30b and received by the detector 37. For example, the control portion 50 acquires the two-dimensional cross-sectional shape of the groove of the rim of the eyeglass frame based on the reflected light received by the detector 37. In the present example, a cross-sectional image is acquired as the cross-sectional shape. It is needless to say that the cross-sectional shape may be acquired as a signal.

Here, in a case where the groove of the rim of the eyeglass frame F is not irradiated with the measurement light, the cross-sectional shape (a cross-sectional image in the present example) cannot be acquired. Therefore, the control portion 50 performs drive control for irradiating the groove of the rim of the eyeglass frame F with the measurement light in a case where the groove of the rim of the eyeglass frame F is not irradiated with the measurement light. Hereinafter, the drive control for irradiating the groove of the rim of the eyeglass frame F with the measurement light will be described.

Figure 10:
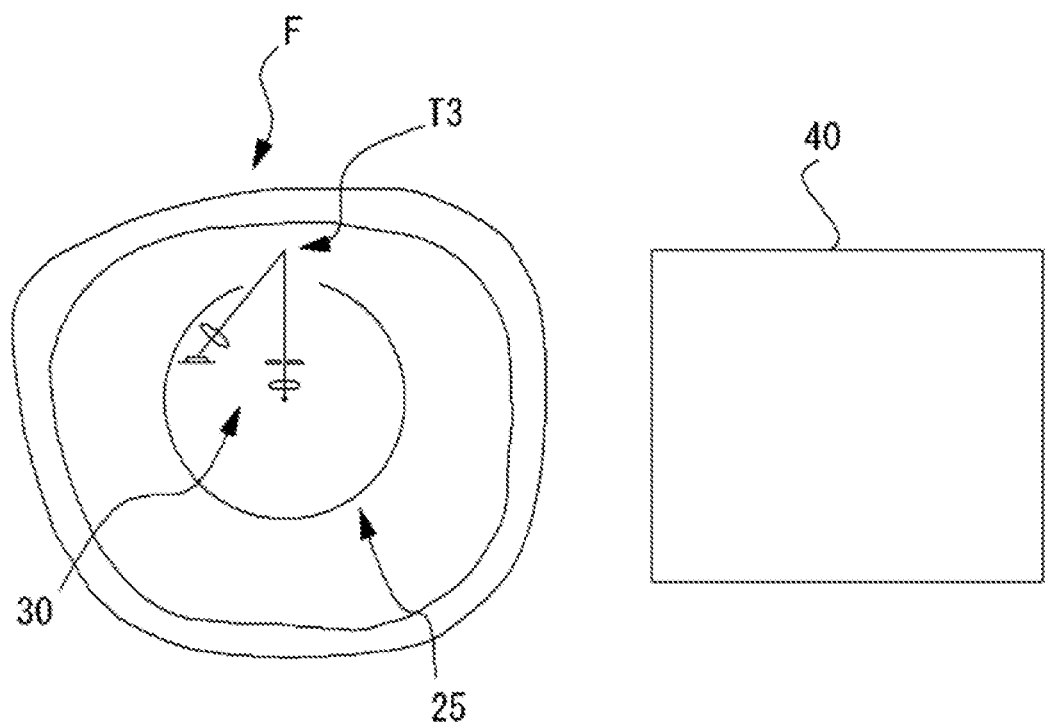
FIG. 10 is a view illustrating a light reception result before moving a holding unit such that a groove of the rim of the eyeglass frame is irradiated with measurement light.
Figure 11:
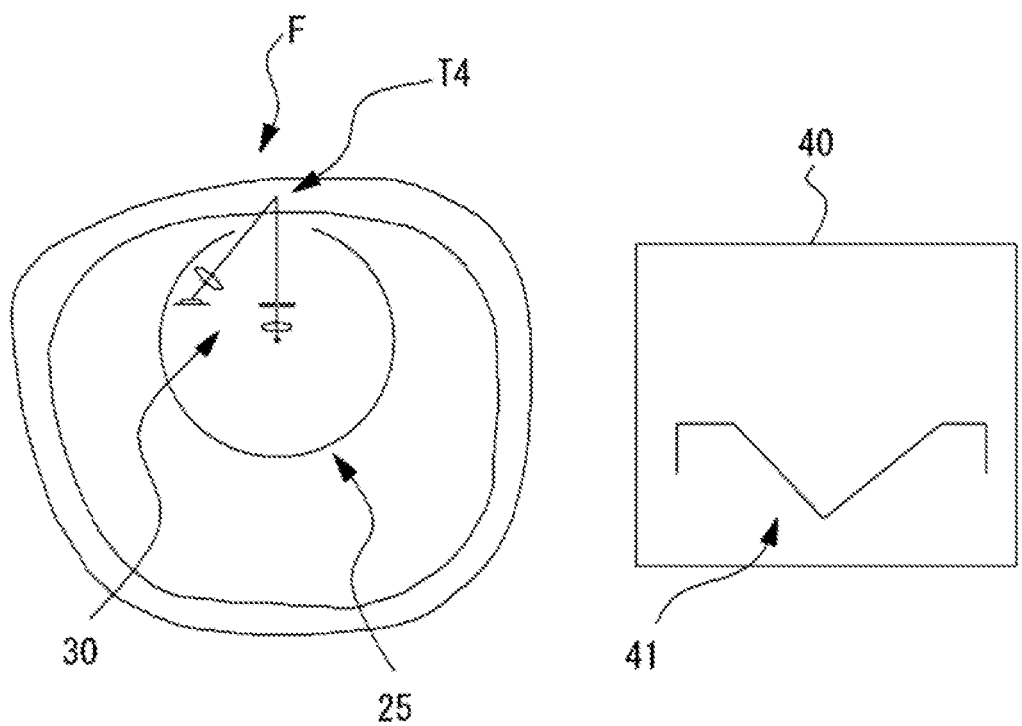
FIG. 11 is a view illustrating the light reception result after moving the holding unit such that the groove of the rim of the eyeglass frame is irradiated with the measurement light.

For example, FIG. 10 is a view illustrating the light reception result before moving the holding unit 25 such that the groove of the rim of the eyeglass frame F is irradiated with the measurement light. For example, FIG. 11 is a view illustrating the light reception result after moving the holding unit 25 such that the groove of the rim of the eyeglass frame F is irradiated with the measurement light.

For example, in FIG. 10, an irradiation position T3 of the light projecting optical system 30a is not positioned at the groove of the rim. Therefore, the reflected light from the groove of the rim of the eyeglass frame F cannot be received. For example, in a case where the control portion 50 has acquired the cross-sectional image in a state where the reflected light is not received, the cross-sectional image is not displayed on an image 40 indicating the acquisition result. Meanwhile, in FIG. 11, an irradiation position T4 of the light projecting optical system 30a is positioned at the groove of the rim. Therefore, the reflected light from the groove of the rim of the eyeglass frame F can be received. For example, in a case where the control portion 50 has acquired the cross-sectional image in a state where the reflected light was received, a cross-sectional image 41 is displayed on the image 40 indicating the acquisition result.

For example, in the present example, the control portion 50 controls the moving unit 210 based on the light reception result when moving the holding unit 25 such that the groove of the rim of the eyeglass frame F is irradiated with the measurement light. For example, the control portion 50 controls the moving unit 210 based on whether or not the cross-sectional image has been acquired. For example, the control portion 50 analyzes the acquired image 40 and controls the moving unit 210 such that the cross-sectional image is detected in a case where the cross-sectional image has not been detected.

Figure 12:
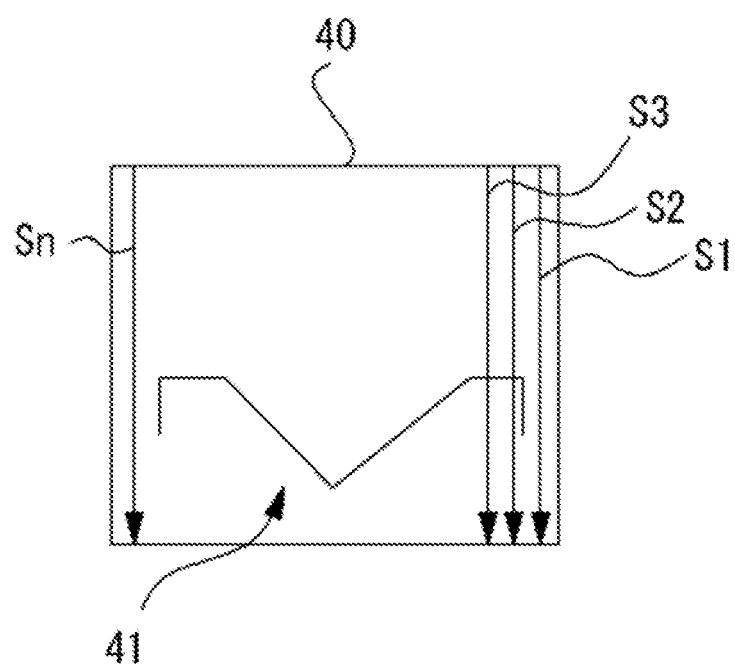
FIG. 12 is a view for describing acquisition of a luminance distribution for a cross-sectional image.

For example, the control portion 50 can detect whether or not the cross-sectional image has been acquired by detecting a change in luminance value. For example, in a case where the cross-sectional image is acquired, a certain luminance value is detected. In other words, since the reflected light can be detected by the detector, the luminance value increases. FIG. 12 is a view for describing detection of the luminance value. For example, the control portion 50 detects the luminance value in the order of a scanning line S1, a scanning line S2, a scanning line S3, . . . , and a scanning line Sn with respect to the acquired cross-sectional image, and obtains a luminance distribution. In other words, the control portion 50 can extract the cross-sectional image of the rim from the image by detecting the luminance value.

Here, depending on the type of the eyeglass frame F, there is a case where the luminance level of the received reflected light is not excellent, and it is difficult to accurately acquire the cross-sectional shape of the groove of the rim. Therefore, the control portion 50 controls the luminance level.

Accordingly, the cross-sectional shape of the groove of the rim can be acquired accurately. Hereinafter, the control of the luminance level will be described. In the present example, as a configuration for controlling the luminance level, a configuration for controlling the light projection amount of the light source 31 is described as an example. It is needless to say the configuration for controlling the luminance level is not limited to the above-described configuration.

For example, as a configuration for controlling the luminance level, at least one of a configuration for controlling the gain of the detector 37, a configuration for providing a member that adjusts the amount of the measurement light in the optical path from the light source 31 to the detector 37, a configuration for controlling the exposure time in the detector 37, and a configuration for controlling the light emitting time of the light source 31 may be employed.

In the present example, for example, the control portion 50 performs the pre-measurement (measurement before the main measurement) after performing the control such that the cross-sectional image can be detected. For example, the control portion 50 performs the pre-measurement at an initial position for starting the measurement and acquires the cross-sectional image. For example, the control portion 50 detects the luminance level (luminance value) from the cross-sectional image, and controls the luminance level based on the detected luminance level. For example, the control portion 50 determines whether or not the luminance level is an acceptable level, and controls the luminance level in a case of obtaining the determination result that the luminance level does not satisfy the acceptable level.

The position where the pre-measurement is performed is not limited to the initial position. For example, any position may be selected by the operator and set as a position for performing the pre-measurement. Further, for example, the pre-measurement may be performed at a plurality of positions. In this case, for example, in a case where the determination result is obtained that the pre-measured luminance level does not satisfy the acceptable level at least at one position at a plurality of positions where the pre-measurement is performed, the luminance level may be controlled. Further, in a case where the determination result is obtained that the luminance level of the pre-measurement does not satisfy the acceptable level at all positions, the luminance level may be controlled.

More detailed description will be made. In the present example, for example, the control portion 50 detects the luminance value from the cross-sectional image, and a predetermined evaluation value is used as an index indicating the luminance level. For example, the evaluation value may be obtained from an equation of evaluation value= ((average maximum luminance value of image)−(average luminance value of background region of image))/(standard deviation of luminance value of background region). For example, the control portion 50 detects the luminance value in the order of the scanning line S1, the scanning line S2, the scanning line S3, . . . , and the scanning line Sn with respect to the acquired cross-sectional image, and obtains the luminance distribution.

Here, for example, a control portion 70 calculates the maximum value of the luminance value (hereinafter, abbreviated as the maximum luminance value) from the luminance distribution that corresponds to each scanning line. In addition, the control portion 70 calculates the average value of the maximum luminance value in each scanning line as the maximum luminance value in the cross-sectional image. Further, the control portion 70 calculates the average value of the luminance value of the background region in each scanning line as the average luminance value of the background region in the cross-sectional image.

For example, the control portion 50 determines whether or not the evaluation value of the cross-sectional image acquired as described above satisfies a predetermined threshold value. The predetermined threshold value may be a preset threshold value. For example, a threshold value at which the luminance level is determined to be excellent by a simulation or an experiment may be set in advance. For example, the threshold value may be configured to be a value that can be set by the examiner. Further, for example, the threshold value may be set based on the acquired cross-sectional image.

For example, the control portion 50 controls (changes) the light projection amount of the light source 76 based on the determination result. For example, in a case where it is determined that the evaluation value of the cross-sectional image does not satisfy a predetermined threshold value (for example, smaller than the predetermined threshold value), the control portion 50 performs control such that the luminance level increases. For example, in a case where it is determined that the evaluation value of the cross-sectional image does not satisfy the predetermined threshold value, the control portion 50 increases the light projection amount of the light source 31 such that the evaluation value of the cross-sectional image satisfies the predetermined threshold value.

In addition, for example, in a case where it is determined that the evaluation value of the cross-sectional image satisfies the predetermined threshold value (for example, equal to or larger than the predetermined threshold value), the control portion 50 maintains the light projection amount of the light source 31 without performing the control of the luminance level. It is needless to say that the control portion 50 may control the luminance level such that the luminance level becomes more appropriate even in a case where it is determined that the evaluation value of the cross-sectional image satisfies the predetermined threshold value. For example, there is a case where it becomes difficult to detect the cross-sectional shape of the rim of the eyeglass frame as the luminance level of the cross-sectional image becomes excessively high. Therefore, in a case where the evaluation value satisfies the predetermined threshold value and the difference between the evaluation value and the threshold value is larger than the predetermined value, the luminance level may be controlled such that the difference becomes equal to or less than the predetermined value.

In addition, the determination method for controlling the luminance level is not limited to the above-described method. For example, as a determination method, in the cross-sectional image, it may be determined whether or not an integrated value (total luminance value for each pixel) obtained by integrating the luminance values for each pixel satisfies the acceptable level. For example, as a determination method, it may be determined whether or not an average value (weighted average of all luminance) when dividing the sum of the luminance values for each pixel in the cross-sectional image by the number of pixels satisfies the acceptable level. In other words, any determination method that can determine whether or not the luminance level affects the detection of the cross-sectional shape of the rim based on the luminance distribution in the cross-sectional image may be used.

For example, the control portion 50 starts the main measurement when the pre-measurement is performed and the control of the luminance level is completed. As described above, the cross-sectional image of the groove of the rim at the predetermined position can be acquired. For example, the control portion 50 controls the rotation unit 260 and changes the position where the cross-sectional image of the groove of the rim is acquired while changing the vector angle with the rotation shaft (in the present example, the shaft passing through the light source 31) LO as a center. Accordingly, the position where the cross-sectional image of the rim is acquired is moved in the peripheral direction of the rim. For example, every time the position where the cross-sectional image of the rim is acquired is changed, the control portion 50 controls the moving unit 210 and changes the irradiation position such that the groove of the rim is irradiated with the measurement light.

For example, the control portion 50 stores the cross-sectional image in the memory 52 for each predetermined rotation angle when the cross-sectional image of the groove of the rim is acquired at each vector angle. Further, the position where each cross-sectional image is acquired is obtained by an arithmetic operation from at least one of the number of pulses of the motor 225, the number of pulses of the motor 235, the number of pulses of the motor 245, and the detection result of the encoder 265a, and is stored in the memory 52. In other words, by acquiring at least one of the number of pulses of the motor 225, the number of pulses of the motor 235, the number of pulses of the motor 245, and the detection result of the encoder 265a, the position where the cross-sectional image of the rim is acquired can be specified. In this manner, for example, the control portion 50 can acquire the position (acquisition position information) at which the cross-sectional image of the groove of the rim is acquired. For example, the acquisition position information can be used when acquiring the three-dimensional cross-sectional image of the groove of the rim, the shape of the eyeglass frame, and the like.

Figure 13:
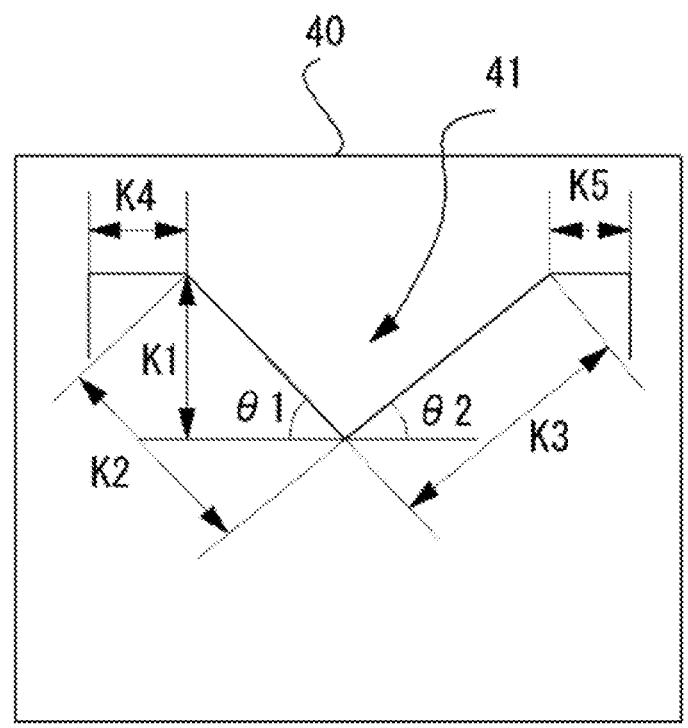
FIG. 13 is a view for describing parameters acquired from the cross-sectional image of the groove of the rim.

For example, the control portion 50 can acquire various parameters related to the groove of the rim by performing analysis processing with respect to the acquired cross-sectional image. FIG. 13 is a view for describing parameters acquired from the cross-sectional image of the groove of the rim. For example, the control portion 50 can acquire the parameters of the groove of the rim by acquiring the luminance distribution of the cross-sectional image by image processing. For example, as the parameters of the groove of the rim, the control portion 50 can obtain a distance K1 to the bottom of the groove of the rim, left and right slope angles $\theta1$ and $\theta2$ of the groove of the rim, left and right slope lengths K2 and K3 of the groove of the rim, lengths K4 and K5 of the left and right rim shoulders, and the like.

For example, the control portion 50 can acquire the cross-sectional image of the groove of the rim in the entire periphery of the rim by repeating the above-described control over the entire periphery of the rim. For example, when the acquisition of the cross-sectional image of the groove of the rim in the entire periphery of the rim is completed, the control portion 50 calls the cross-sectional image of the entire periphery of the rim and the acquisition position information stored in the memory 52, performs arithmetic processing, and acquires the three-dimensional cross-sectional image. For example, the control portion 50 stores the acquired three-dimensional cross-sectional image in the memory 52. In the present example, the configuration in which the three-dimensional cross-sectional image is acquired after the acquisition of the cross-sectional image in the entire periphery of the rim has been described as an example, but the present disclosure is not limited thereto. For each acquisition position of the cross-sectional image of the groove of the rim, the arithmetic processing may be performed every time the cross-sectional image is acquired.

For example, the control portion 50 can acquire the shape (shape data) of the eyeglass frame from the acquired cross-sectional image. For example, the control portion 50 detects the bottom of the groove of the rim at each of the plurality of vector angles of the eyeglass frame from the cross-sectional image of the groove of the rim at the plurality of vector angles of the eyeglass frame, and acquires the shape of the eyeglass frame based on the detected detection result.

For example, the control portion 50 can detect the position of the bottom of the groove of the rim by acquiring the luminance distribution of the cross-sectional image by the image processing. As illustrated in FIG. 12, for example, the control portion 50 detects the luminance value in the order of the scanning line S1, the scanning line S2, the scanning line S3, . . . and the scanning line Sn with respect to the acquired cross-sectional image, and obtains the luminance distribution. For example, the control portion 50 may detect the position where the luminance value is detected at the lowest position in the obtained luminance distribution as the bottom of the groove of the rim.

For example, the control portion 50 processes each of the cross-sectional images acquired for each vector angle, and detects each position of the bottom of the groove of the rim on the image. For example, the control portion 50 acquires the position information of the bottom of the groove of the rim from the position of the bottom of the groove of the rim on the image detected from the cross-sectional image and the acquired position information acquired from the cross-sectional image. For example, the control portion 50 detects the position of the bottom of the groove of the rim on the image from the cross-sectional images acquired for each vector angle, and acquires each piece of position information of the bottom of the rim for each vector angle from the position of the bottom of the groove of the rim on the detected image and the acquired position information obtained by acquiring the cross-sectional image. Accordingly, for example, the control portion 50 acquires the three-dimensional shape (rn, zn, θn) (n=1, 2, 3, . . . , N) of the eyeglass frame F. For example, the three-dimensional shape of the eyeglass frame Fn may be acquired over the entire periphery of the rim, or may be acquired in a partial region of the entire periphery of the rim. As described above, the shape of the eyeglass frame F can be acquired.

In the present example, a configuration in which the three-dimensional shape of the eyeglass frame is acquired by acquiring the position information of the bottom of the groove of the rim for each vector angle has been described as an example, but the present disclosure is not limited thereto. For example, when acquiring the three-dimensional shape of the eyeglass frame, at each vector angle, with respect to the position where the bottom of the groove of the rim is not acquired, the position information of the bottom of the groove of the rim may be acquired by interpolation based on the position information of the bottom of the groove of the rim at a vector angle of the periphery. For example, when acquiring the three-dimensional shape of the eyeglass frame, at each vector angle, with respect to the position where the position information of the bottom of the groove of the rim is not acquired, the result of approximation of the position information of the bottom of the groove of the rim at the vector angle of the periphery may be interpolated.

For example, when the measurement of the right rim FR is completed, the control portion 50 controls the driving of the X moving unit 240 and moves the holding unit 25 to a predetermined position for the measurement of the left rim FL. Similar to the above-described measurement control, the acquisition of the cross-sectional shape of the right rim FR and the shape of the eyeglass frame are acquired. The cross-sectional images and shapes of the right rim FR and the left rim FL are stored in the memory 52.

For example, various parameters may be acquired based on the acquired three-dimensional shape of the eyeglass frame. For example, a two-dimensional shape may be acquired from the three-dimensional shape of the eyeglass frame. For example, the two-dimensional shape can be acquired by making a shape obtained by projecting the three-dimensional shape onto the XY plane in the front direction of the eyeglass frame F. As the two-dimensional shape, a configuration for acquiring the three-dimensional shape has been described as an example, but the present disclosure is not limited thereto. When acquiring the position information of the bottom of the groove of the rim based on the cross-sectional image of the rim at each vector angle, the position information may be acquired by detecting only the position information of the bottom of the groove of the rim on the XY plane.

As described above, the cross-sectional shape of the groove of the rim, the shape of the eyeglass frame, and the like which are acquired by the eyeglass frame shape measurement device 1 are transmitted to the lens processing device 300 by the control portion 50. For example, the control portion 310 of the lens processing device 300 receives the cross-sectional shape of the groove of the rim, the shape of the eyeglass frame, and the like which are acquired by the eyeglass frame shape measurement device 1.

For example, the lens processing device 300 includes lens rotating means for rotating while holding the lens on a lens chuck shaft, and processing tool rotating means for rotating the processing tool attached to a processing tool rotating shaft. For example, in the lens processing device 300, the control portion 310 of the lens processing device controls the lens rotating means and the processing tool rotating means based on the acquired information (for example, the cross-sectional shape of the groove of the rim of the eyeglass frame, the shape of the eyeglass frame, and the like) acquired by the eyeglass frame shape measurement device 1, and processes the peripheral edge of the lens. The control portion 310 of the lens processing device may be configured such that the control portion of the eyeglass frame shape measurement device 1 is also used, or the control portion 310 for performing various controls of the lens processing device may be provided separately.

For example, in the present example, the eyeglass frame shape measurement device includes the light projecting optical system that emits the measurement light from the light source toward the rim of the eyeglass frame, the light receiving optical system that causes the detector to receive the reflected light of the measurement light emitted toward the rim of the eyeglass frame by the light projecting optical system and reflected by the rim of the eyeglass frame, and the acquisition means for acquiring the cross-sectional shape of the rim of the eyeglass frame based on the reflected light received by the detector. Accordingly, for example, the cross-sectional shape of the rim of the eyeglass frame can be acquired easily and accurately. In addition, for example, since measurement is performed using the measurement light, the measurement can be performed quickly.

Further, for example, in the present example, the eyeglass frame shape measurement device includes the first changing means for changing the irradiation position of the measurement light on the groove of the rim of the eyeglass frame, and the first control means for controlling the first changing means. Accordingly, it becomes possible to irradiate any position of the groove of the rim in the eyeglass frame with the measurement light, and to acquire the cross-sectional shape of the groove of the rim at any position.

For example, in the present example, in the eyeglass frame shape measurement device, the first changing means is the changing means for moving at least a part of the light projecting optical system, and the first control means controls the first changing means to change at least a part of the light projecting optical system with respect to the groove of the rim of the eyeglass frame and change the irradiation position of the measurement light with respect to the groove of the rim of the eyeglass frame. Accordingly, it becomes possible to irradiate any position of the groove of the rim in the eyeglass frame with the measurement light, and to acquire the cross-sectional shape of the groove of the rim at any position.

Further, for example, in the present example, the eyeglass frame shape measurement device includes the second changing means for changing the light receiving position of reflected light by the light receiving optical system, and second control means for controlling the second changing means. Accordingly, the light receiving position can be changed to a position where the cross-sectional shape of the groove of the rim can be acquired excellently, and the cross-sectional shape of the rim of the eyeglass frame can be acquired more accurately.

Further, for example, in the present example, in the eyeglass frame shape measurement device, the first control means controls the first changing means to irradiate the groove of the rim at the plurality of vector angles of the eyeglass frame with the measurement light. The acquisition means may acquire the cross-sectional shape of the groove of the rim at each of the plurality of vector angles of the eyeglass frame. The eyeglass frame shape measurement device includes the analysis means for detecting the bottom of the groove of the rim at each of the plurality of vector angles of the eyeglass frame from the cross-sectional shape of the groove of the rim at the plurality of vector angles of the eyeglass frame to acquire the shape of the eyeglass frame based on the detected detection result. Accordingly, unlike the related art, depending on the eyeglass frame, it is possible to suppress a case where the measurement cannot be performed due to detachment of a probe from the groove of the lens frame, and the shape of the eyeglass frame can be acquired easily and accurately with respect to the various shapes of the eyeglass frame.

Further, for example, in the present example, in the eyeglass frame shape measurement device, the first control means controls the first changing means to irradiate the groove of the rim at the plurality of vector angles of the eyeglass frame with the measurement light. The acquisition means acquires the cross-sectional shape of the groove of the rim at each of the plurality of vector angles of the eyeglass frame, and acquires the three-dimensional cross-sectional shape. Accordingly, the three-dimensional cross-sectional shape of the eyeglass frame can be acquired easily and accurately.

Further, for example, in the present example, the lens processing device includes processing control means for processing the peripheral edge of the lens based on the cross-sectional shape of the groove of the rim of the eyeglass frame. Accordingly, when the processed lens is excellently framed into the eyeglass frame, the shape of the groove of the rim and the contour shape of the processed lens are close to each other, and thus, the framing can be excellently performed.

In the present example, at least one of the cross-sectional shape and the shape of the eyeglass frame may be displayed on the display 3. It is needless to say that the display may be performed on a display (not illustrated) of the lens processing device 300. For example, the cross-sectional shape and the shape of the eyeglass frame may be displayed on the display 3 by different screens. In this case, the cross-sectional shape and the shape of the eyeglass frame may be switched and displayed by switching the screen. For example, the cross-sectional shape and the shape of the eyeglass frame may be displayed on the same screen. In this case, for example, the cross-sectional shape and the shape of the eyeglass frame may be arranged side by side on the same screen. At this time, for example, in the shape of the eyeglass frame, a display indicating the acquisition position of the cross-sectional shape may be displayed such that the acquisition position of the cross-sectional shape can be identified. In this case, for example, the cross-sectional shape and the shape of the eyeglass frame may be superimposed and displayed on the same screen. In a case where the superimposed display is performed, the cross-sectional shape and the shape of the eyeglass frame may be aligned based on the acquisition position information of the cross-sectional shape and the acquisition position of the cross-sectional shape of the groove of the rim.

In the present example, a configuration in which the luminance level is detected from the cross-sectional image and the luminance level is controlled has been described as an example, but the present disclosure is not limited thereto. For example, the luminance level may be controlled based on the eyeglass frame type information. For example, a configuration in which settings for controlling the luminance level are set in advance for each eyeglass frame type may be employed. In this case, for example, when the eyeglass frame type is selected by the operator, the control portion 50 performs control setting of the luminance level that corresponds to the selected eyeglass frame type. For example, the control portion 50 sets the light projection amount of the light source 31 to a light projection amount that corresponds to the selected eyeglass frame type.

In addition, the control of the luminance level based on the eyeglass frame type information is not limited to the control of the light projection amount of the light source. For example, based on the eyeglass frame type information, at least one of a configuration for controlling the gain of the detector 37, a configuration for providing a member that adjusts the amount of the measurement light in the optical path from the light source 31 to the detector 37, a configuration for controlling the exposure time in the detector 37, and a configuration for controlling the light emitting time of the light source 31 may be employed. It is needless to say that, based on the eyeglass frame type information, as the configuration for controlling the luminance level, a configuration different from the above-described configuration may be employed as long as the luminance level can be controlled.

In addition, as the eyeglass frame type, a configuration in which at least one of the shape of the eyeglass frame, the material of the eyeglass frame, the color of the eyeglass frame, the design of the eyeglass frame and the like are set may be employed. For example, the eyeglass frame type may be set for each item. In this case, the shape of the eyeglass frame may be set to Nylor, the material of the eyeglass frame may be set to metal, and the color of the eyeglass frame may be set to gray.

In this case, for example, when a predetermined eyeglass frame type is selected, in addition to the selected eyeglass frame type, other eyeglass frame types may be set. For example, in a case where any material of the eyeglass frame, such as metal, plastic, or optic, is selected, the shape of the eyeglass frame may be set as Full rim. In this case, the eyeglass frame types may be associated with each other in advance.

In addition, the eyeglass frame types are not limited to these types, and various types of eyeglass frame can be set. It is needless to say that the eyeglass frame type may be configured to be added or deleted in any manner by the examiner.

As an example, for example, in a case where the material of the eyeglass frame is set with plastic, the control portion 50 may control the luminance level to be higher than the luminance level in a case where the material of the eyeglass frame is metal. For example, in a case where the material of the eyeglass frame is set with plastic, the control portion 50 may control the light projection amount of the light source 31 to be larger than a light projection amount of the light source 31 for measuring metal. In addition, for example, in a case where the material of the eyeglass frame is set with plastic, the control portion 50 may control the gain of the detector 37 to be higher than the gain of the detector 37 for measuring metal.

REFERENCE SIGNS LIST

1 eyeglass frame shape measurement device
3 display
4 switch portion
10 frame holding unit
20 measurement unit
25 holding unit
30 eyeglass frame measurement optical system
30a light projecting optical system
30b light receiving optical system
31 light source
37 detector
58
50 control portion
52 memory
210 moving unit
220 Z moving unit
230 Y moving unit
240 X moving unit
260 rotation unit
300 lens processing device
310 control portion

The invention claimed is:

1. An eyeglass frame shape measurement device that measures a shape of an eyeglass frame, comprising:
    a light projecting optical system having a light source and configured to emit measurement light from the light source toward a groove of a rim of an eyeglass frame;
    a light receiving optical system having a detector and configured to cause the detector to receive reflected light of the measurement light emitted toward the groove of the rim of the eyeglass frame by the light projecting optical system and reflected by the groove of the rim of the eyeglass frame;
    a controller, comprising a processor, a memory and programming having an acquisition section and a luminance control section;
    the acquisition section is configured to acquire a cross-sectional shape of the groove of the rim of the eyeglass frame based on the reflected light received by the detector; and
    the luminance control section is configured to control a luminance level of the reflected light to be received by the detector;
    the eyeglass frame shape measurement device further comprises a first changing section comprising a translational motor drive for translational movement and a rotation motor drive for rotational movement and configured to change an irradiation position of the measurement light with respect to the groove of the rim of the eyeglass frame; and
    wherein the controller further comprises a first control section configured to control the first changing section.

2. The eyeglass frame shape measurement device according to claim 1,
    wherein the luminance control section controls the luminance level based on the luminance level of the reflected light received by the detector.

3. The eyeglass frame shape measurement device according to claim 2,
    wherein the acquisition section acquires a cross-sectional image as the cross-sectional shape,
    the controller further comprises a luminance analysis section configured to detect the luminance level from the cross-sectional image, and
    the luminance control section controls the luminance level based on the luminance level detected by the luminance analysis section.

4. The eyeglass frame shape measurement device according to claim 2,
    wherein the controller further comprises a determination section configured to determine whether or not the luminance level is an acceptable level, and
    wherein the luminance control section controls the luminance level based on a determination result of the determination section.

5. The eyeglass frame shape measurement device according to claim 1,
    wherein the controller further comprises an eyeglass frame type information acquisition section configured to acquire eyeglass frame type information,
    wherein the luminance control section controls the luminance level based on the eyeglass frame type information acquired by the eyeglass frame type information acquisition section.

6. The eyeglass frame shape measurement device according to claim 1,
    wherein the luminance control section controls the luminance level by controlling an amount of the measurement light projected from the light source.

7. The eyeglass frame shape measurement device according to claim 1,
    wherein the luminance control section controls the luminance level by controlling a gain of the detector.

8. The eyeglass frame shape measurement device according to claim 1,
    wherein the acquisition section acquires the cross-sectional shape of the groove of the rim of the eyeglass frame based on the reflected light which is received by the detector after the luminance level is controlled to be changed by the luminance control section.

9. The eyeglass frame shape measurement device according to claim 1, wherein the first control section controls the first changing section to irradiate the groove of the rim at a plurality of vector angles of the eyeglass frame with the measurement light, the acquisition section acquires the cross-sectional shape of the groove of the rim at each of the plurality of vector angles of the eyeglass frame, and the controller further comprises an analysis section configured to detect a bottom of the groove of the rim at each of the plurality of vector angles of the eyeglass frame from the cross-sectional shape of the groove of the rim at the plurality of vector angles of the eyeglass frame to acquire a shape of the eyeglass frame based on the detected detection result.

10. A lens processing device for processing a peripheral edge of a lens, comprising:

a lens processing controller configured to process a peripheral edge of a lens based on a cross-sectional shape of a groove of the rim of the eyeglass frame acquired by the eyeglass frame shape measurement device according to claim 1.

11. An eyeglass frame shape measurement device that measures a shape of an eyeglass frame, comprising:

a light projecting optical system having a light source and configured to emit measurement light from the light source toward a groove of a rim of an eyeglass frame;

a light receiving optical system having a detector and configured to cause the detector to receive reflected light of the measurement light emitted toward the groove of the rim of the eyeglass frame by the light projecting optical system and reflected by the groove of the rim of the eyeglass frame;

a controller, comprising a processor, a memory and programming having an acquisition section and a luminance control section;

a changing section comprising a translational motor drive for translational movement and a rotation motor drive for rotational movement and configured to change a light receiving position of the reflected light by the light receiving optical system; and the controller further comprising a control section configured to control the changing section;

wherein the acquisition section is configured to acquire a cross-sectional shape of the groove of the rim of the eyeglass frame based on the reflected light received by the detector; and the luminance control section is configured to control a luminance level of the reflected light to be received by the detector.

12. The eyeglass frame shape measurement device according to claim 11, wherein the luminance control section controls the luminance level based on the luminance level of the reflected light received by the detector.

13. The eyeglass frame shape measurement device according to claim 12, wherein the acquisition section acquires a cross-sectional image as the cross-sectional shape, the controller further comprises a luminance analysis section configured to detect the luminance level from the cross-sectional image, and the luminance control section controls the luminance level based on the luminance level detected by the luminance analysis section.

14. The eyeglass frame shape measurement device according to claim 12, wherein the controller further comprises a determination section configured to determine whether or not the luminance level is an acceptable level, and wherein the luminance control section controls the luminance level based on a determination result of the determination section.

15. The eyeglass frame shape measurement device according to claim 11, wherein the controller further comprises an eyeglass frame type information acquisition section configured to acquire eyeglass frame type information, wherein the luminance control section controls the luminance level based on the eyeglass frame type information acquired by the eyeglass frame type information acquisition section.

16. The eyeglass frame shape measurement device according to claim 11, wherein the luminance control section controls the luminance level by controlling an amount of the measurement light projected from the light source.

17. The eyeglass frame shape measurement device according to claim 11, wherein the luminance control section controls the luminance level by controlling a gain of the detector.

18. The eyeglass frame shape measurement device according to claim 11, wherein the acquisition section acquires the cross-sectional shape of the groove of the rim of the eyeglass frame based on the reflected light which is received by the detector after the luminance level is controlled to be changed by the luminance control section.

19. A lens processing device for processing a peripheral edge of a lens, comprising:

a lens processing controller configured to process a peripheral edge of a lens based on a cross-sectional shape of a groove of the rim of the eyeglass frame acquired by the eyeglass frame shape measurement device according to claim 11.

* * * * *